United States Patent
Iyoshi et al.

(10) Patent No.: US 12,516,851 B2
(45) Date of Patent: Jan. 6, 2026

(54) REFRIGERATION CYCLE SYSTEM

(71) Applicant: DAIKIN INDUSTRIES, LTD., Osaka (JP)

(72) Inventors: Yuta Iyoshi, Osaka (JP); Yoshiki Yamanoi, Osaka (JP); Kumiko Saeki, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 271 days.

(21) Appl. No.: 18/204,064

(22) Filed: May 31, 2023

(65) Prior Publication Data

US 2023/0324086 A1  Oct. 12, 2023

Related U.S. Application Data

(63) Continuation of application No. PCT/JP2021/043884, filed on Nov. 30, 2021.

(30) Foreign Application Priority Data

Dec. 1, 2020 (JP) .................................. 2020-199796

(51) Int. Cl.
*F25B 7/00* (2006.01)
*F25B 41/20* (2021.01)
(Continued)

(52) U.S. Cl.
CPC ............... *F25B 7/00* (2013.01); *F25B 41/20* (2021.01); *F25B 41/40* (2021.01); *F25B 49/02* (2013.01)

(58) Field of Classification Search
CPC .. F25B 7/00; F25B 41/20; F25B 41/40; F25B 49/02
See application file for complete search history.

(56) References Cited

U.S. PATENT DOCUMENTS

| 2011/0016897 | A1* | 1/2011 | Akagi | F25B 29/003 |
| | | | | 62/161 |
| 2011/0289952 | A1* | 12/2011 | Kim | F24D 17/02 |
| | | | | 62/189 |

(Continued)

FOREIGN PATENT DOCUMENTS

| CN | 203940649 U | 11/2014 |
| CN | 210980415 U | 7/2020 |

(Continued)

OTHER PUBLICATIONS

International Search Report (PCT/ISA/210) issued in PCT/JP2021/043884, dated Jan. 11, 2022.

(Continued)

*Primary Examiner* — Henry T Crenshaw
(74) *Attorney, Agent, or Firm* — Birch, Stewart, Kolasch & Birch, LLP

(57) ABSTRACT

A primary refrigerant circuit allows circulation of a primary refrigerant and includes a primary compressor, a cascade heat exchanger, and a primary heat exchanger. A secondary refrigerant circuit allows circulation of a secondary refrigerant and includes a secondary compressor, the cascade heat exchanger, and a utilization heat exchanger. The primary refrigerant circuit includes a first connecting pipe, a primary first connection pipe, and a liquid connecting pipe connecting the cascade heat exchanger and the primary heat exchanger, a primary suction flow path of the primary compressor, a primary subcooling circuit connecting the liquid connecting pipe and the primary suction flow path, and a primary subcooling expansion valve provided in the primary subcooling circuit.

20 Claims, 10 Drawing Sheets

(51) Int. Cl.
   *F25B 41/40*   (2021.01)
   *F25B 49/02*   (2006.01)

(56) References Cited

U.S. PATENT DOCUMENTS

| | | | | |
|---|---|---|---|---|
| 2014/0013790 | A1* | 1/2014 | Asari | F25B 1/00 |
| | | | | 62/335 |
| 2017/0182869 | A1* | 6/2017 | Kujak | B60H 1/3228 |

FOREIGN PATENT DOCUMENTS

| | | |
|---|---|---|
| EP | 2 314 953 A1 | 4/2011 |
| EP | 3 312 524 A1 | 4/2018 |
| EP | 3 348 934 A1 | 7/2018 |
| EP | 3 457 049 A1 | 3/2019 |
| EP | 3 643 988 A1 | 4/2020 |
| EP | 3 862 656 A1 | 8/2021 |
| JP | 59-38568 A | 3/1984 |
| JP | 2004-190917 A | 7/2004 |
| JP | 2007-218460 A | 8/2007 |
| JP | 2008-39332 A | 2/2008 |
| JP | 2009-139014 A | 6/2009 |
| JP | 2013-210150 A | 10/2013 |
| JP | 2014-109405 A | 6/2014 |
| JP | 2016-11783 A | 1/2016 |
| JP | 2019-20090 A | 2/2019 |
| WO | WO 2016/203624 A1 | 12/2016 |
| WO | WO 2018/235832 A1 | 12/2018 |
| WO | WO 2020/071300 A1 | 4/2020 |

OTHER PUBLICATIONS

Extended European Search Report for European Application No. 21800672.4, dated Sep. 5, 2023.
English translation of the International Search Report for International Application No. PCT/JP2021/017705, dated Jun. 22, 2021.
International Preliminary Report on Patentability and English translation of the Written Opinion of the International Searching Authority for International Application No. PCT/JP2021/017705, dated Nov. 17, 2022.
International Preliminary Report on Patentability and English translation of the Written Opinion of the International Searching Authority for International Application No. PCT/JP2021/043884, dated Jun. 15, 2023.
Extended European Search Report for European Application No. 21900597.2, dated Jul. 9, 2024.

* cited by examiner

REFRIGERATION CYCLE SYSTEM

CROSS REFERENCE TO RELATED APPLICATIONS

This application is a Continuation of PCT International Application No. PCT/JP2021/043884, filed on Nov. 30, 2021, which claims priority under 35 U.S.C. § 119 (a) to Patent Application No. JP 2020-199796, filed in Japan on Dec. 1, 2020, all of which are hereby expressly incorporated by reference into the present application.

TECHNICAL FIELD

The present disclosure relates to a refrigeration cycle system.

BACKGROUND ART

Like a refrigeration apparatus exemplarily described in Patent Literature 1 (WO 2018/235832 A), there has conventionally been known a binary refrigeration apparatus including a primary refrigerant circuit and a secondary refrigerant circuit connected to each other via a cascade heat exchanger.

SUMMARY

A refrigeration cycle system according to a first aspect includes a first circuit and a second circuit. The first circuit allows circulation of the first refrigerant. The first circuit includes a first compressor, a cascade heat exchanger, and a first heat exchanger. The second circuit allows circulation of a second refrigerant. The second circuit includes a second compressor, the cascade heat exchanger, and a second heat exchanger. The first circuit includes a first flow path, a suction flow path, a bypass circuit, and a controlling valve. The first flow path connects the cascade heat exchanger and the first heat exchanger. The suction flow path extends from a suction side of the first compressor. The bypass circuit connects the first flow path and the suction flow path. The controlling valve is provided on the bypass circuit. When the cascade heat exchanger functions as a radiator for the first refrigerant and functions as an evaporator for the second refrigerant, the controlling valve is opened if an index on a degree of subcooling of the first refrigerant at an outlet of the cascade heat exchanger satisfies a predetermined first condition.

DESCRIPTION OF EMBODIMENTS (1) Configuration of Refrigeration Cycle System

Figure 1:
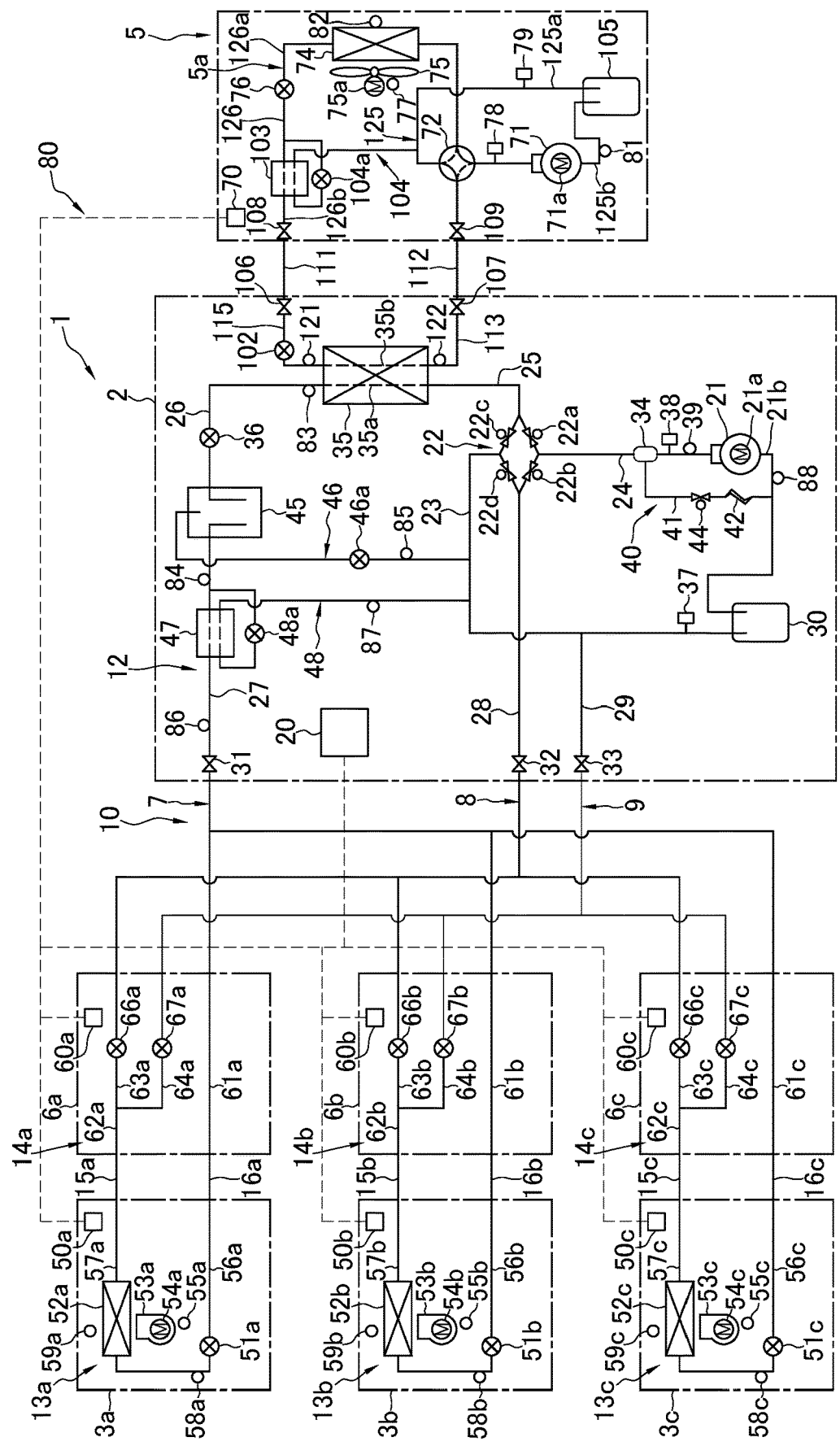
FIG. 1 is a schematic configuration diagram of a refrigeration cycle system.
Figure 2:
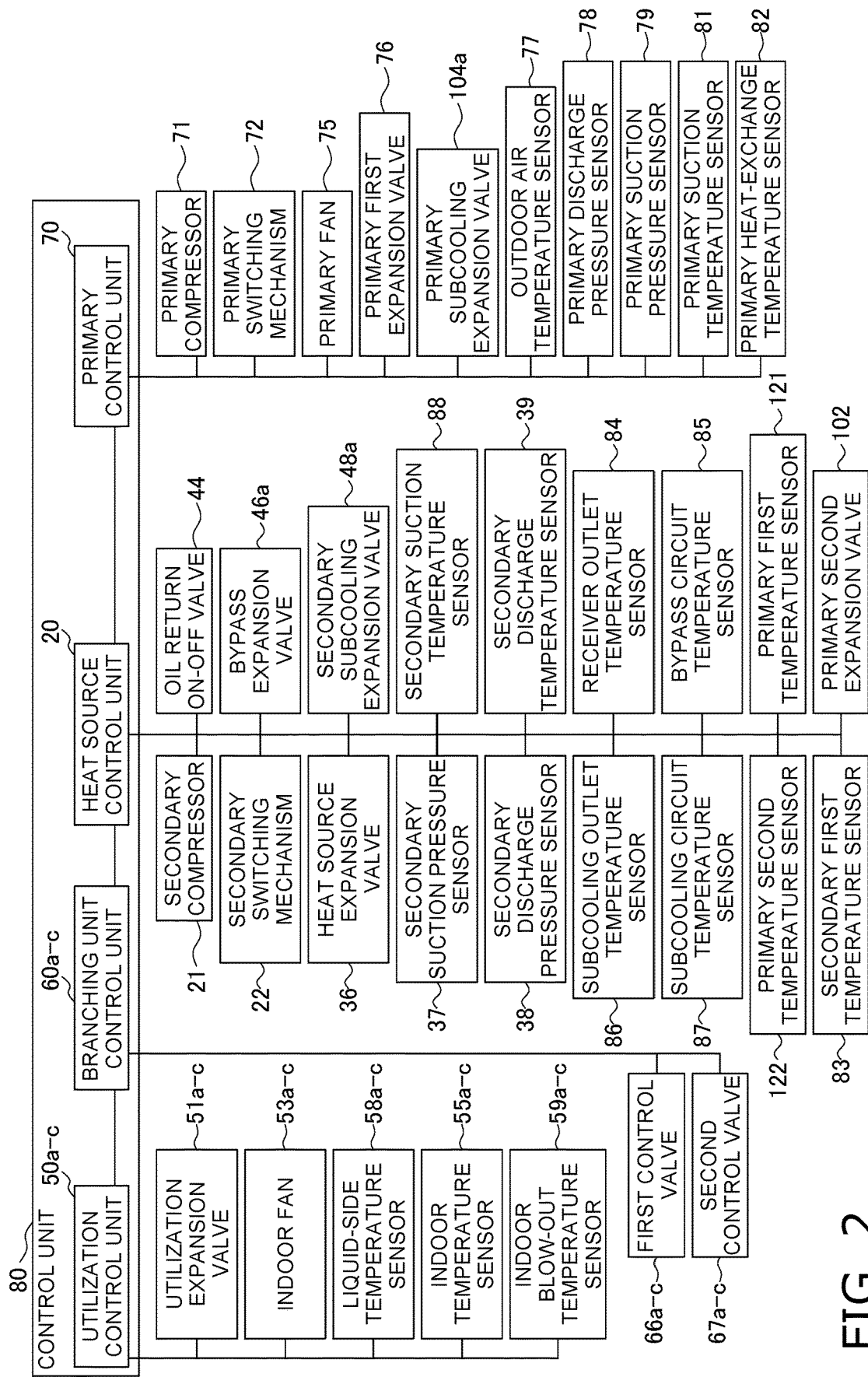
FIG. 2 is a schematic functional block configuration diagram of the refrigeration cycle system.

FIG. 1 is a schematic configuration diagram of a refrigeration cycle system 1. FIG. 2 is a schematic functional block configuration diagram of the refrigeration cycle system 1.

The refrigeration cycle system 1 is configured to execute vapor compression refrigeration cycle operation to be used for cooling or heating an indoor space of a building or the like.

The refrigeration cycle system 1 includes a binary refrigerant circuit consisting of a vapor compression primary refrigerant circuit 5a (corresponding to a first circuit) and a vapor compression secondary refrigerant circuit 10 (corresponding to a second circuit), and achieves a binary refrigeration cycle. The primary refrigerant circuit 5a encloses a refrigerant such as R32 (corresponding to a first refrigerant). The secondary refrigerant circuit 10 encloses a refrigerant such as carbon dioxide (corresponding to a second refrigerant). The primary refrigerant circuit 5a and the secondary refrigerant circuit 10 are thermally connected via a cascade heat exchanger 35 to be described later.

The refrigeration cycle system 1 includes a primary unit 5, a heat source unit 2, a plurality of branching units 6a, 6b, and 6c, and a plurality of utilization units 3a, 3b, and 3c, which are connected correspondingly via pipes. The primary unit 5 and the heat source unit 2 are connected via a primary first connection pipe 111 and a primary second connection pipe 112. The heat source unit 2 and the plurality of branching units 6a, 6b, and 6c are connected via three connection pipes, namely, a secondary second connection pipe 9, a secondary first connection pipe 8, and a secondary third connection pipe 7. The plurality of branching units 6a, 6b, and 6c and the plurality of utilization units 3a, 3b, and 3c are connected via first branching connecting tubes 15a, 15b, and 15c and second branching connecting tubes 16a, 16b, and 16c. The present embodiment provides the single primary unit 5. The present embodiment provides the single heat source unit 2. The plurality of utilization units 3a, 3b, and 3c according to the present embodiment includes three utilization units, namely, a first utilization unit 3a, a second utilization unit 3b, and a third utilization unit 3c. The plurality of branching units 6a, 6b, and 6c according to the present embodiment includes three branching units, namely, a first branching unit 6a, a second branching unit 6b, and a third branching unit 6c.

In the refrigeration cycle system 1, the utilization units 3a, 3b, and 3c are configured to individually execute cooling operation or heating operation, and a utilization unit executing heating operation can send a refrigerant to a utilization unit executing cooling operation to achieve heat recovery between the utilization units. Specifically, heat recovery is achieved in the present embodiment by executing mainly cooling operation or mainly heating operation of simultaneously executing cooling operation and heating operation. Furthermore, the refrigeration cycle system 1 is configured to balance a heat load of the heat source unit 2 in accordance with heat loads of all the plurality of utilization units 3a, 3b, and 3c also in consideration of heat recovery mentioned above (mainly cooling operation or mainly heating operation).

(2) Primary Refrigerant Circuit

The primary refrigerant circuit 5a includes a primary compressor 71 (corresponding to a first compressor), a primary switching mechanism 72, a primary heat exchanger 74 (corresponding to a first heat exchanger), a liquid connecting pipe 126 (corresponding to part of a first flow path), a primary first expansion valve 76, a primary subcooling heat exchanger 103, a primary subcooling circuit 104 (corresponding to a bypass circuit), a primary subcooling expansion valve 104a (corresponding to a controlling valve), a first liquid shutoff valve 108, the primary first connection pipe 111 (corresponding to part of the first flow path), a second liquid shutoff valve 106, a first connecting pipe 115 (corresponding to part of the first flow path), a primary second expansion valve 102, the cascade heat exchanger 35 shared with the secondary refrigerant circuit 10, a second connecting pipe 113, a second gas shutoff valve 107, the primary second connection pipe 112, a first gas shutoff valve 109, a primary suction flow path 125 (corresponding to a suction flow path), and a primary accumulator 105 (corresponding to an accumulator).

The primary compressor 71 is configured to compress a primary refrigerant, and is exemplarily constituted by a positive-displacement compressor of a scroll type or the like configured to inverter control a compressor motor 71a to have variable operating capacity.

The primary accumulator 105 is provided at a halfway portion of the primary suction flow path 125 connecting the primary switching mechanism 72 and a suction side of the primary compressor 71.

The primary suction flow path 125 includes a first suction flow path 125a connecting the primary switching mechanism 72 and the primary accumulator 105, and a second suction flow path 125b connecting the primary accumulator 105 and the suction side of the primary compressor 71.

In a case where the cascade heat exchanger 35 functions as an evaporator for the primary refrigerant, the primary switching mechanism 72 comes into a fifth connection state of connecting a suction side of the primary compressor 71 and a gas side of a primary flow path 35b of the cascade heat exchanger 35 (see solid lines in the primary switching mechanism 72 in FIG. 1). In another case where the cascade heat exchanger 35 functions as a radiator for the primary refrigerant, the primary switching mechanism 72 comes into a sixth connection state of connecting a discharge side of the primary compressor 71 and the gas side of the primary flow path 35b of the cascade heat exchanger 35 (see broken lines in the primary switching mechanism 72 in FIG. 1). The primary switching mechanism 72 is thus configured to switch the flow path of the refrigerant in the primary refrigerant circuit 5a, and is exemplarily constituted by a four-way switching valve. With change in switching state of the primary switching mechanism 72, the cascade heat exchanger 35 can function as the evaporator or the radiator for the primary refrigerant.

The cascade heat exchanger 35 is configured to cause heat exchange between the primary refrigerant such as R32 and a secondary refrigerant such as carbon dioxide without mixing the refrigerants. The cascade heat exchanger 35 is exemplarily constituted by a plate heat exchanger. The cascade heat exchanger 35 includes a secondary flow path 35a belonging to the secondary refrigerant circuit 10, and the primary flow path 35b belonging to the primary refrigerant circuit 5a. The secondary flow path 35a has a gas side connected to a secondary switching mechanism 22 via a third heat source pipe 25, and a liquid side connected to a heat source expansion valve 36 via a fourth heat source pipe 26. The primary flow path 35b has the gas side connected to the primary compressor 71 via the second connecting pipe 113, the second gas shutoff valve 107, the primary second connection pipe 112, the first gas shutoff valve 109, the primary switching mechanism 72, the first suction flow path 125a, the primary accumulator 105, and the second suction flow path 125b, and a liquid side connected to the primary second expansion valve 102 provided on the first connecting pipe 115.

The primary heat exchanger 74 is configured to cause heat exchange between the primary refrigerant and outdoor air. The primary heat exchanger 74 has a gas side connected to a pipe extending from the primary switching mechanism 72. The primary heat exchanger 74 has a liquid side connected to the first liquid shutoff valve 108 via the liquid connecting pipe 126. Examples of the primary heat exchanger 74 include a fin-and-tube heat exchanger constituted by large numbers of heat transfer tubes and fins.

The liquid connecting pipe 126 connects a liquid side end of the primary heat exchanger 74 and the first liquid shutoff valve 108, and includes a first liquid connecting pipe 126a and a second liquid connecting pipe 126b. The first liquid connecting pipe 126a extends from the liquid side end of the primary heat exchanger 74 to the primary first expansion valve 76. The second liquid connecting pipe 126b extends from the primary first expansion valve 76 to the first liquid shutoff valve 108 via the primary subcooling heat exchanger 103.

The primary first expansion valve 76 is provided, on the liquid connecting pipe 126, between the liquid side of the primary heat exchanger 74 and the primary subcooling heat exchanger 103. The primary first expansion valve 76 is an electrically powered expansion valve configured to control a flow rate of the primary refrigerant flowing in the liquid connecting pipe 126 of the primary refrigerant circuit 5a and having a controllable opening degree.

The primary subcooling circuit 104 branches from a portion between the primary first expansion valve 76 and the primary subcooling heat exchanger 103 on the liquid connecting pipe 126, and is connected to the first suction flow path 125a included in the primary suction flow path 125. The primary subcooling expansion valve 104a is provided upstream of the primary subcooling heat exchanger 103 in the primary subcooling circuit 104. The primary subcooling expansion valve 104a is an electrically powered expansion valve configured to control a flow rate of the primary refrigerant flowing in the primary subcooling circuit 104 and having a controllable opening degree.

The primary subcooling heat exchanger 103 is configured to cause heat exchange between a refrigerant flowing from the primary first expansion valve 76 toward the first liquid shutoff valve 108 and a refrigerant decompressed at the primary subcooling expansion valve 104a in the primary subcooling circuit 104.

The primary first connection pipe 111 is a pipe connecting the first liquid shutoff valve 108 and the second liquid shutoff valve 106, and connects the primary unit 5 and the heat source unit 2.

The primary second connection pipe 112 is a pipe connecting the first gas shutoff valve 109 and the second gas shutoff valve 107, and connects the primary unit 5 and the heat source unit 2.

The first connecting pipe 115 connects the second liquid shutoff valve 106 and the liquid side of the primary flow path 35b of the cascade heat exchanger 35, and is provided at the heat source unit 2.

The primary second expansion valve 102 is an electrically powered expansion valve provided on the first connecting pipe 115, configured to control a flow rate of the primary refrigerant flowing in the first connecting pipe 115, and having a controllable opening degree.

The second connecting pipe 113 connects the gas side of the primary flow path 35b of the cascade heat exchanger 35 and the second gas shutoff valve 107, and is provided at the heat source unit 2.

The first gas shutoff valve 109 is provided at a portion between the primary second connection pipe 112 and the primary switching mechanism 72.

(3) Secondary Refrigerant Circuit

The secondary refrigerant circuit 10 includes the plurality of utilization units 3a, 3b, and 3c, the plurality of branching units 6a, 6b, and 6c, and the heat source unit 2, which are connected correspondingly. Each of the utilization units 3a, 3b, and 3c is connected to a corresponding one of the branching units 6a, 6b, and 6c one by one. Specifically, the utilization unit 3a and the branching unit 6a are connected via the first branching connecting tube 15a and the second branching connecting tube 16a, the utilization unit 3b and the branching unit 6b are connected via the first branching connecting tube 15b and the second branching connecting tube 16b, and the utilization unit 3c and the branching unit 6c are connected via the first branching connecting tube 15c and the second branching connecting tube 16c. Each of the branching units 6a, 6b, and 6c are connected to the heat source unit 2 via three connection pipes, namely, the secondary third connection pipe 7, the secondary first connection pipe 8, and the secondary second connection pipe 9. Specifically, the secondary third connection pipe 7, the secondary first connection pipe 8, and the secondary second connection pipe 9 extending from the heat source unit 2 are each branched into a plurality of pipes connected to the branching units 6a, 6b, and 6c.

The secondary first connection pipe 8 has a flow of either the refrigerant in a gas-liquid two-phase state or the refrigerant in a gas state in accordance with an operating state. Depending on the type of the second refrigerant, the secondary first connection pipe 8 has a flow of the refrigerant in a supercritical state in accordance with the operating state. The secondary second connection pipe 9 has a flow of either the refrigerant in the gas-liquid two-phase state or the refrigerant in the gas state in accordance with the operating state. The secondary third connection pipe 7 has a flow of either the refrigerant in the gas-liquid two-phase state or the refrigerant in a liquid state in accordance with the operating state. Depending on the type of the second refrigerant, the secondary third connection pipe 7 has a flow of the refrigerant in the supercritical state in accordance with the operating state.

The secondary refrigerant circuit 10 includes a heat source circuit 12, branching circuits 14a, 14b, and 14c, and a utilization circuits 13a, 13b, and 13c, which are connected correspondingly.

The heat source circuit 12 principally includes a secondary compressor 21 (corresponding to a second compressor), the secondary switching mechanism 22, a first heat source pipe 28, a second heat source pipe 29, a suction flow path 23, a discharge flow path 24, the third heat source pipe 25, the fourth heat source pipe 26, a fifth heat source pipe 27, the cascade heat exchanger 35, the heat source expansion valve 36 (corresponding to a second expansion valve), a third shutoff valve 31, a first shutoff valve 32, a second shutoff valve 33, a secondary accumulator 30, an oil separator 34, an oil return circuit 40, a secondary receiver 45, a bypass circuit 46, a bypass expansion valve 46a, a secondary subcooling heat exchanger 47, a secondary subcooling circuit 48, and a secondary subcooling expansion valve 48a.

The secondary compressor 21 is configured to compress the secondary refrigerant, and is exemplarily constituted by a positive-displacement compressor of a scroll type or the like configured to inverter control a compressor motor 21a to have variable operating capacity. The secondary compressor 21 is controlled in accordance with an operating load so as to have larger operating capacity as the load increases.

The secondary switching mechanism 22 is configured to switch a connection state of the secondary refrigerant circuit 10, specifically, the flow path of the refrigerant in the heat source circuit 12. The secondary switching mechanism 22 according to the present embodiment includes four switching valves 22a, 22b, 22c, and 22d constituted as two-way valves aligned on an annular flow path. The secondary switching mechanism 22 may alternatively be constituted by a plurality of three-way switching valves combined together. The secondary switching mechanism 22 includes the first switching valve 22a provided on a flow path connecting the discharge flow path 24 and the third heat source pipe 25, the second switching valve 22b provided on a flow path connecting the discharge flow path 24 and the first heat source pipe 28, the third switching valve 22c provided on a flow path connecting the suction flow path 23 and the third heat source pipe 25, and the fourth switching valve 22d provided on a flow path connecting the suction flow path 23 and the first heat source pipe 28. Each of the first switching valve 22a, the second switching valve 22b, the third switching valve 22c, and the fourth switching valve 22d according to the present embodiment is an electromagnetic valve configured to be switchable between an opened state and a closed state.

In a case where the cascade heat exchanger 35 functions as a radiator for the secondary refrigerant, the secondary switching mechanism 22 comes into a first connection state of bringing the first switching valve 22a into the opened state to connect a discharge side of the secondary compressor 21 and the gas side of the secondary flow path 35a of the cascade heat exchanger 35, and bringing the third switching valve 22c into the closed state. In another case where the cascade heat exchanger 35 functions as an evaporator for the secondary refrigerant, the secondary switching mechanism 22 comes into a second connection state of bringing the third switching valve 22c into the opened state to connect a suction side of the secondary compressor 21 and the gas side of the secondary flow path 35a of the cascade heat exchanger 35, and bringing the first switching valve 22a into the closed state. In a case where the secondary refrigerant discharged from the secondary compressor 21 is sent to the secondary first connection pipe 8, the secondary switching mechanism 22 comes into a third connection state of bringing the second switching valve 22b into the opened state to connect the discharge side of the secondary compressor 21 and the secondary first connection pipe 8, and bringing the fourth switching valve 22d into the closed state. In another case where the refrigerant flowing in the secondary first connection pipe 8 is sucked into the secondary compressor 21, the secondary switching mechanism 22 comes into a fourth connection state of bringing the fourth switching valve 22d into the opened state to connect the secondary first connection pipe 8 and the suction side of the secondary compressor 21, and bringing the second switching valve 22b into the closed state.

As described above, the cascade heat exchanger 35 is configured to cause heat exchange between the primary refrigerant such as R32 and the secondary refrigerant such as carbon dioxide without mixing the refrigerants. The cascade heat exchanger 35 includes the secondary flow path 35a having a flow of the secondary refrigerant in the secondary refrigerant circuit 10 and the primary flow path 35b having a flow of the primary refrigerant in the primary refrigerant circuit 5a, so as to be shared between the primary unit 5 and the heat source unit 2. The cascade heat exchanger 35 according to the present embodiment is disposed in a heat source casing 2x of the heat source unit 2. The gas side of the primary flow path 35b of the cascade heat exchanger 35 extends to the primary second connection pipe 112 outside the heat source casing 2x via the second connecting pipe 113 and the second gas shutoff valve 107. The liquid side of the primary flow path 35b of the cascade heat exchanger 35 extends to the primary first connection pipe 111 outside the heat source casing 2x via the primary second expansion valve 102, the first connecting pipe 115, and the second liquid shutoff valve 106.

The heat source expansion valve 36 is an electrically powered expansion valve having a controllable opening degree and connected to a liquid side of the cascade heat exchanger 35, in order for control and the like of a flow rate of the secondary refrigerant flowing in the cascade heat exchanger 35. The heat source expansion valve 36 is provided on the fourth heat source pipe 26.

Each of the third shutoff valve 31, the first shutoff valve 32, and the second shutoff valve 33 is provided at a connecting port with an external device or pipe (specifically, the connection pipe 7, 8, or 9). Specifically, the third shutoff valve 31 is connected to the secondary third connection pipe 7 led out of the heat source unit 2. The first shutoff valve 32 is connected to the secondary first connection pipe 8 led out of the heat source unit 2. The second shutoff valve 33 is connected to the secondary second connection pipe 9 led out of the heat source unit 2.

The first heat source pipe 28 is a refrigerant pipe connecting the first shutoff valve 32 and the secondary switching mechanism 22. Specifically, the first heat source pipe 28 connects the first shutoff valve 32 and a portion between the second switching valve 22b and the fourth switching valve 22d in the secondary switching mechanism 22.

The suction flow path 23 connects the secondary switching mechanism 22 and the suction side of the secondary compressor 21. Specifically, the suction flow path 23 connects a portion between the third switching valve 22c and the fourth switching valve 22d in the secondary switching mechanism 22 and the suction side of the secondary compressor 21. The suction flow path 23 has a halfway portion provided with the secondary accumulator 30.

The second heat source pipe 29 is a refrigerant pipe connecting the second shutoff valve 33 and another halfway portion of the suction flow path 23. The second heat source pipe 29 according to the present embodiment is connected to the suction flow path 23 at a connection point between the portion between the second switching valve 22b and the fourth switching valve 22d in the secondary switching mechanism 22 and the secondary accumulator 30 on the suction flow path 23.

The discharge flow path 24 is a refrigerant pipe connecting the discharge side of the secondary compressor 21 and the secondary switching mechanism 22. Specifically, the discharge flow path 24 connects the discharge side of the secondary compressor 21 and a portion between the first switching valve 22a and the second switching valve 22b in the secondary switching mechanism 22.

The third heat source pipe 25 is a refrigerant pipe connecting the secondary switching mechanism 22 and a gas side of the cascade heat exchanger 35. Specifically, the third heat source pipe 25 connects a portion between the first switching valve 22a and the third switching valve 22c in the secondary switching mechanism 22 and a gas side end of the secondary flow path 35a in the cascade heat exchanger 35.

The fourth heat source pipe 26 is a refrigerant pipe connecting the liquid side (opposite to the gas side, and opposite to the side provided with the secondary switching mechanism 22) of the cascade heat exchanger 35 and the secondary receiver 45. Specifically, the fourth heat source pipe 26 connects a liquid side end (opposite end to the gas side) of the secondary flow path 35a in the cascade heat exchanger 35 and the secondary receiver 45.

The secondary receiver 45 is a refrigerant reservoir configured to reserve a residue refrigerant in the secondary refrigerant circuit 10. The secondary receiver 45 is provided with the fourth heat source pipe 26, the fifth heat source pipe 27, and the bypass circuit 46 extending outward.

The bypass circuit 46 is a refrigerant pipe connecting a gas phase region corresponding to an upper region in the secondary receiver 45 and the suction flow path 23. Specifically, the bypass circuit 46 is connected between the secondary switching mechanism 22 and the secondary accumulator 30 on the suction flow path 23. The bypass circuit 46 is provided with the bypass expansion valve 46a. The bypass expansion valve 46a is an electrically powered expansion valve having a controllable opening degree to control quantity of the refrigerant guided from inside the secondary receiver 45 to the suction side of the secondary compressor 21.

The fifth heat source pipe 27 is a refrigerant pipe connecting the secondary receiver 45 and the third shutoff valve 31.

The secondary subcooling circuit 48 is a refrigerant pipe connecting part of the fifth heat source pipe 27 and the suction flow path 23. Specifically, the secondary subcooling circuit 48 is connected between the secondary switching mechanism 22 and the secondary accumulator 30 on the suction flow path 23. The secondary subcooling circuit 48 according to the present embodiment extends to branch from a portion between the secondary receiver 45 and the secondary subcooling heat exchanger 47.

The secondary subcooling heat exchanger 47 is configured to cause heat exchange between the refrigerant flowing in a flow path belonging to the fifth heat source pipe 27 and the refrigerant flowing in a flow path belonging to the secondary subcooling circuit 48. The secondary subcooling heat exchanger 47 according to the present embodiment is provided between a portion from where the secondary subcooling circuit 48 branches and the third shutoff valve 31 on the fifth heat source pipe 27. The secondary subcooling expansion valve 48a is provided between a portion branching from the fifth heat source pipe 27 and the secondary subcooling heat exchanger 47 on the secondary subcooling circuit 48. The secondary subcooling expansion valve 48a is an electrically powered expansion valve having a controllable opening degree and configured to supply the secondary subcooling heat exchanger 47 with a decompressed refrigerant.

The secondary accumulator 30 is a reservoir configured to reserve the secondary refrigerant, and is provided on the suction side of the secondary compressor 21.

The oil separator 34 is provided at a halfway portion of the discharge flow path 24. The oil separator 34 is configured to separate refrigerating machine oil discharged from the secondary compressor 21 along with the secondary refrigerant from the secondary refrigerant and return the refrigerating machine oil to the secondary compressor 21.

The oil return circuit 40 is provided to connect the oil separator 34 and the suction flow path 23. The oil return circuit 40 includes an oil return flow path 41 as a flow path extending from the oil separator 34 and extending to join a portion between the secondary accumulator 30 and the suction side of the secondary compressor 21 on the suction flow path 23. The oil return flow path 41 has a halfway portion provided with an oil return capillary tube 42 and an oil return on-off valve 44. When the oil return on-off valve 44 is controlled into the opened state, the refrigerating machine oil separated in the oil separator 34 passes the oil return capillary tube 42 on the oil return flow path 41 and is returned to the suction side of the secondary compressor 21. When the secondary compressor 21 is in operation on the secondary refrigerant circuit 10, the oil return on-off valve 44 according to the present embodiment repetitively is kept in the opened state for predetermined time and is kept in the closed state for predetermined time, to control returned quantity of the refrigerating machine oil through the oil return circuit 40. The oil return on-off valve 44 according to the present embodiment is an electromagnetic valve controlled to be opened and closed. The oil return on-off valve 44 may alternatively be an electrically powered expansion valve having a controllable opening degree and not provided with the oil return capillary tube 42.

Description is made below to the utilization circuits 13a, 13b, and 13c. As the utilization circuits 13b and 13c are configured similarly to the utilization circuit 13a, elements of the utilization circuits 13b and 13c will not be described repeatedly, assuming that a subscript "b" or "c" will replace a subscript "a" in reference signs denoting elements of the utilization circuit 13a.

The utilization circuit 13a principally includes a utilization heat exchanger 52a (corresponding to a second heat exchanger), a first utilization pipe 57a, a second utilization pipe 56a, and a utilization expansion valve 51a.

The utilization heat exchanger 52a is configured to cause heat exchange between a refrigerant and indoor air, and examples thereof include a fin-and-tube heat exchanger constituted by large numbers of heat transfer tubes and fins. The plurality of utilization heat exchangers 52a, 52b, and 52c are connected in parallel to the secondary switching mechanism 22, the suction flow path 23, and the cascade heat exchanger 35.

The second utilization pipe 56a has a first end connected to a liquid side (opposite to a gas side) of the utilization heat exchanger 52a in the first utilization unit 3a. The second utilization pipe 56a has a second end connected to the second branching connecting tube 16a. The second utilization pipe 56a has a halfway portion provided with the utilization expansion valve 51a described above.

The utilization expansion valve 51a is an electrically powered expansion valve configured to control a flow rate of the refrigerant flowing in the utilization heat exchanger 52a, and having a controllable opening degree. The utilization expansion valve 51a is provided on the second utilization pipe 56a.

The first utilization pipe 57a has a first end connected to the gas side of the utilization heat exchanger 52a in the first utilization unit 3a. The first utilization pipe 57a according to the present embodiment is connected to a portion opposite to the utilization expansion valve 51a of the utilization heat exchanger 52a. The first utilization pipe 57a has a second end connected to the first branching connecting tube 15a.

Description is made below to the branching circuits 14a, 14b, and 14c. As the branching circuits 14b and 14c are configured similarly to the branching circuit 14a, elements of the branching circuits 14b and 14c will not be described repeatedly, assuming that a subscript "b" or "c" will replace a subscript "a" in reference signs denoting elements of the branching circuit 14a.

The branching circuit 14a principally includes a junction pipe 62a, a first branching pipe 63a, a second branching pipe 64a, a first control valve 66a, a second control valve 67a, and a third branching pipe 61a.

The junction pipe 62a has a first end connected to the first branching connecting tube 15a. The junction pipe 62a has a second end branched to be connected with the first branching pipe 63a and the second branching pipe 64a.

The first branching pipe 63a has a portion opposite to the junction pipe 62a and connected to the secondary first connection pipe 8. The first branching pipe 63a is provided with the first control valve 66a configured to be opened and closed. The first control valve 66a is exemplified herein by an electrically powered expansion valve having a controllable opening degree, but may alternatively be an electromagnetic valve configured only to be opened and closed.

The second branching pipe 64a has a portion opposite to the junction pipe 62a and connected to the secondary second connection pipe 9. The second branching pipe 64a is provided with the second control valve 67a configured to be opened and closed. The second control valve 67a is exemplified herein by an electrically powered expansion valve having a controllable opening degree, but may alternatively be an electromagnetic valve configured only to be opened and closed.

The third branching pipe 61a has a first end connected to the second branching connecting tube 16a. The third branching pipe 61a has a second end connected to the secondary third connection pipe 7.

During cooling operation to be described later, the first branching unit 6a brings the first control valve 66a and the second control valve 67a into the opened state so as to function as follows. The first branching unit 6a sends, to the second branching connecting tube 16a, the refrigerant flowing into the third branching pipe 61a via the secondary third connection pipe 7. The refrigerant flowing in the second utilization pipe 56a in the first utilization unit 3a via the second branching connecting tube 16a is sent to the utilization heat exchanger 52a in the first utilization unit 3a via the utilization expansion valve 51a. The refrigerant sent to the utilization heat exchanger 52a is evaporated by heat exchange with indoor air, and then flows in the first branching connecting tube 15a via the first utilization pipe 57a. The refrigerant having flowed in the first branching connecting tube 15a is sent to the junction pipe 62a in the first branching unit 6a. The refrigerant having flowed in the junction pipe 62a is branched into the first branching pipe 63a and the second branching pipe 64a. The refrigerant having passed the first control valve 66a on the first branching pipe 63a is sent to the secondary first connection pipe 8. The refrigerant having passed the second control valve 67a on the second branching pipe 64a is sent to the secondary second connection pipe 9.

In a case where the first utilization unit 3a cools the indoor space during mainly cooling operation and mainly heating operation to be described later, the first branching unit 6a brings the first control valve 66a into the closed state and the second control valve 67a into the opened state so as to function as follows. The first branching unit 6a sends, to the second branching connecting tube 16a, the refrigerant flowing into the third branching pipe 61a via the secondary third connection pipe 7. The refrigerant flowing in the second utilization pipe 56a in the first utilization unit 3a via the second branching connecting tube 16a is sent to the utilization heat exchanger 52a in the first utilization unit 3a via the utilization expansion valve 51a. The refrigerant sent to the utilization heat exchanger 52a is evaporated by heat exchange with indoor air, and then flows in the first branching connecting tube 15a via the first utilization pipe 57a. The refrigerant having flowed in the first branching connecting tube 15a is sent to the junction pipe 62a in the first branching unit 6a. The refrigerant having flowed in the junction pipe 62a flows to the second branching pipe 64a and passes the second control valve 67a to be subsequently sent to the secondary second connection pipe 9.

During heating operation to be described later, the first branching unit 6a brings the second control valve 67a into the opened or closed state and brings the first control valve 66a into the opened state in accordance with an operation condition so as to function as follows. In the first branching unit 6a, the refrigerant flowing into the first branching pipe 63a via the secondary first connection pipe 8 passes the first control valve 66a to be sent to the junction pipe 62a. The refrigerant having flowed in the junction pipe 62a flows in the first utilization pipe 57a in the utilization unit 3a via the first branching connecting tube 15a to be sent to the utilization heat exchanger 52a. The refrigerant sent to the utilization heat exchanger 52a radiates heat through heat exchange with indoor air, and then passes the utilization expansion valve 51a provided on the second utilization pipe 56a. The refrigerant having passed the second utilization pipe 56a flows in the third branching pipe 61a in the first branching unit 6a via the second branching connecting tube 16a to be subsequently sent to the secondary third connection pipe 7.

In another case where the first utilization unit 3a heats the indoor space during mainly cooling operation and mainly heating operation to be described later, the first branching unit 6a brings the second control valve 67a into the closed state and brings the first control valve 66a into the opened state so as to function as follows. In the first branching unit 6a, the refrigerant flowing into the first branching pipe 63a via the secondary first connection pipe 8 passes the first control valve 66a to be sent to the junction pipe 62a. The refrigerant having flowed in the junction pipe 62a flows in the first utilization pipe 57a in the utilization unit 3a via the first branching connecting tube 15a to be sent to the utilization heat exchanger 52a. The refrigerant sent to the utilization heat exchanger 52a radiates heat through heat exchange with indoor air, and then passes the utilization expansion valve 51a provided on the second utilization pipe 56a. The refrigerant having passed the second utilization pipe 56a flows in the third branching pipe 61a in the first branching unit 6a via the second branching connecting tube 16a to be subsequently sent to the secondary third connection pipe 7.

The first branching unit 6a, as well as the second branching unit 6b and the third branching unit 6c, similarly have such a function. Accordingly, the first branching unit 6a, the second branching unit 6b, and the third branching unit 6c are configured to individually switchably cause the utilization heat exchangers 52a, 52b, and 52c to function as a refrigerant evaporator or a refrigerant radiator.

(4) Primary Unit

The primary unit 5 is disposed in a space different from a space provided with the utilization units 3a, 3b, and 3c and the branching units 6a, 6b, and 6c, on a roof, or the like.

The primary unit 5 includes part of the primary refrigerant circuit 5a described above, a primary fan 75, various sensors, and a primary control unit 70 (corresponding to a first control unit), which are accommodated in a primary casing (not depicted).

The primary unit 5 includes, as the part of the primary refrigerant circuit 5a, the primary compressor 71, the primary switching mechanism 72, the primary heat exchanger 74, the primary first expansion valve 76, the primary subcooling heat exchanger 103, the primary subcooling circuit 104, the primary subcooling expansion valve 104a, the first liquid shutoff valve 108, the first gas shutoff valve 109, and the primary accumulator 105.

The primary fan 75 is provided in the primary unit 5, and is configured to generate an air flow of guiding outdoor air into the primary heat exchanger 74, and exhausting, to outdoors, air obtained after heat exchange with the primary refrigerant flowing in the primary heat exchanger 74. The primary fan 75 is driven by a primary fan motor 75a.

The primary unit 5 is provided with the various sensors. Specifically, there are provided an outdoor air temperature sensor 77 configured to detect temperature of outdoor air to be subject to pass the primary heat exchanger 74, a primary discharge pressure sensor 78 configured to detect pressure of the primary refrigerant discharged from the primary compressor 71, a primary suction pressure sensor 79 configured to detect pressure of the primary refrigerant sucked into the primary compressor 71, a primary suction temperature sensor 81 configured to detect temperature of the primary refrigerant sucked into the primary compressor 71, and a primary heat-exchange temperature sensor 82 configured to detect temperature of the refrigerant flowing in the primary heat exchanger 74.

The primary control unit 70 controls behavior of the elements 71 (71a), 72, 75 (75a), 76, and 104a provided in the primary unit 5. The primary control unit 70 includes a processor such as a CPU or a microcomputer provided to control the primary unit 5 and a memory, so as to transmit and receive control signals and the like to and from a remote controller (not depicted), and to transmit and receive control signals and the like among a heat source control unit 20 in a secondary unit 4, branching unit control units 60a, 60b, and 60c, and utilization control units 50a, 50b, and 50c.

(5) Heat Source Unit

The heat source unit 2 is disposed in a space different from the space provided with the utilization units 3a, 3b, and 3c and the branching units 6a, 6b, and 6c, on a roof, or the like. The heat source unit 2 is connected to the branching units 6a, 6b, and 6c via the connection pipes 7, 8, and 9, to constitute part of the secondary refrigerant circuit 10. The heat source unit 2 is connected with the primary unit 5 via the primary first connection pipe 111 and the primary second connection pipe 112, to constitute part of the primary refrigerant circuit 5a.

The heat source unit 2 principally includes the heat source circuit 12 described above, various sensors, the heat source control unit 20 (corresponding to a second control unit), the second liquid shutoff valve 106 constituting part of the primary refrigerant circuit 5a, the first connecting pipe 115, the primary second expansion valve 102, the second connecting pipe 113, and the second gas shutoff valve 107, which are accommodated in the heat source casing (not depicted).

The heat source unit 2 is provided with a secondary suction pressure sensor 37 configured to detect pressure of the secondary refrigerant on the suction side of the secondary compressor 21, a secondary discharge pressure sensor 38 configured to detect pressure of the secondary refrigerant on the discharge side of the secondary compressor 21, a secondary discharge temperature sensor 39 configured to detect temperature of the secondary refrigerant on the discharge side of the secondary compressor 21, a secondary suction temperature sensor 88 configured to detect temperature of the secondary refrigerant on the suction side of the secondary compressor 21, a secondary first temperature sensor 83 configured to detect temperature of the secondary refrigerant flowing between the secondary flow path 35a of the cascade heat exchanger 35 and the heat source expansion valve 36, a primary first temperature sensor 121 configured to detect temperature of the primary refrigerant flowing between the primary flow path 35b of the cascade heat exchanger 35 and the primary second expansion valve 102, a primary second temperature sensor 122 configured to detect temperature of the primary refrigerant flowing in the second connecting pipe 113 between the primary flow path 35b of the cascade heat exchanger 35 and the second gas shutoff valve 107, a receiver outlet temperature sensor 84 configured to detect temperature of the secondary refrigerant flowing between the secondary receiver 45 and the secondary subcooling heat exchanger 47, a bypass circuit temperature sensor 85 configured to detect temperature of the secondary refrigerant flowing downstream of the bypass expansion valve 46a in the bypass circuit 46, a subcooling outlet temperature sensor 86 configured to detect temperature of the secondary refrigerant flowing between the secondary subcooling heat exchanger 47 and the third shutoff valve 31, and a subcooling circuit temperature sensor 87 configured to detect temperature of the secondary refrigerant flowing at an outlet of the secondary subcooling heat exchanger 47 in the secondary subcooling circuit 48.

The heat source control unit 20 controls behavior of the elements 21 (21a), 22, 36, 44, 46a, 48a, and 102 provided in the heat source unit 2. The heat source control unit 20 controls a valve opening degree of the primary second expansion valve 102 as a component constituting part of, not the secondary refrigerant circuit 10 but the primary refrigerant circuit 5a. The heat source control unit 20 includes a processor such as a CPU or a microcomputer provided to control the heat source unit 2 and a memory, so as to transmit and receive control signals and the like among the primary control unit 70 in the primary unit 5, the utilization control units 50a, 50b, and 50c in the utilization units 3a, 3b, and 3c, and the branching unit control units 60a, 60b, and 60c.

(6) Utilization Unit

The utilization units 3a, 3b, and 3c are installed by being embedded in or being suspended from a ceiling in an indoor space of a building or the like, or by being hung on a wall surface in the indoor space, or the like.

The utilization units 3a, 3b, and 3c are connected to the heat source unit 2 via the connection pipes 7, 8, and 9.

The utilization units 3a, 3b, and 3c respectively include the utilization circuits 13a, 13b, and 13c constituting part of the secondary refrigerant circuit 10.

The utilization units 3a, 3b, and 3c will be described hereinafter in terms of their configurations. The second utilization unit 3b and the third utilization unit 3c are configured similarly to the first utilization unit 3a. The configuration of only the first utilization unit 3a will thus be described herein. As to the configuration of each of the second utilization unit 3b and the third utilization unit 3c, elements will be denoted by reference signs obtained by replacing a subscript "a" in reference signs of elements of the first utilization unit 3a with a subscript "b" or "c", and these elements will not be described repeatedly.

The first utilization unit 3a principally includes the utilization circuit 13a described above, an indoor fan 53a, the utilization control unit 50a, and various sensors. The indoor fan 53a includes an indoor fan motor 54a.

The indoor fan 53a generates an air flow of sucking indoor air into the unit and supplying the indoor space with supply air obtained after heat exchange with the refrigerant flowing in the utilization heat exchanger 52a. The indoor fan 53a is driven by the indoor fan motor 54a.

The utilization unit 3a is provided with a liquid-side temperature sensor 58a configured to detect temperature of a refrigerant on the liquid side of the utilization heat exchanger 52a. The utilization unit 3a is further provided with an indoor temperature sensor 55a configured to detect indoor temperature as temperature of air introduced from the indoor space and to be subject to pass the utilization heat exchanger 52a. Furthermore, the utilization unit 3a is provided with an indoor blow-out temperature sensor 59a configured to detect temperature of air having passed the utilization heat exchanger 52a.

The utilization control unit 50a controls behavior of the elements 51a and 53a (54a) of the utilization unit 3a. The utilization control unit 50a includes a processor such as a CPU or a microcomputer provided to control the utilization unit 3a and a memory, so as to transmit and receive control signals and the like to and from the remote controller (not depicted), and to transmit and receive control signals and the like among the heat source control unit 20 in the secondary unit 4, the branching unit control units 60a, 60b, and 60c, and the primary control unit 70 in the primary unit 5.

The second utilization unit 3b includes the utilization circuit 13b, an indoor fan 53b, the utilization control unit 50b, and an indoor fan motor 54b. The third utilization unit 3c includes the utilization circuit 13c, an indoor fan 53c, the utilization control unit 50c, and an indoor fan motor 54c.

(7) Branching Unit

The branching units 6a, 6b, and 6c are installed in a space behind the ceiling of the indoor space of the building or the like.

Each of the branching units 6a, 6b, and 6c is connected to a corresponding one of the utilization units 3a, 3b, and 3c one by one. The branching units 6a, 6b, and 6c are connected to the heat source unit 2 via the connection pipes 7, 8, and 9.

The branching units 6a, 6b, and 6c will be described next in terms of their configurations. The second branching unit 6b and the third branching unit 6c are configured similarly to the first branching unit 6a. The configuration of only the first branching unit 6a will thus be described herein. As to the configuration of each of the second branching unit 6b and the third branching unit 6c, elements will be denoted by reference signs obtained by replacing a subscript "a" in reference signs of elements of the first branching unit 6a with a subscript "b" or "c", and these elements will not be described repeatedly.

The first branching unit 6a principally includes the branching circuit 14a described above, and the branching unit control unit 60a.

The branching unit control unit 60a controls behavior of the elements 66a and 67a of the branching unit 6a. The branching unit control unit 60a includes a processor such as a CPU or a microcomputer provided to control the branching unit 6a and a memory, so as to transmit and receive control signals and the like to and from the remote controller (not depicted), and to transmit and receive control signals and the like among the heat source control unit 20 in the secondary unit 4, the utilization units 3a, 3b, and 3c, and the primary control unit 70 in the primary unit 5.

The second branching unit 6b includes the branching circuit 14b, and the branching unit control unit 60b. The third branching unit 6c includes the branching circuit 14c, and the branching unit control unit 60c.

(8) Control Unit

In the refrigeration cycle system 1, the heat source control unit 20, the utilization control units 50a, 50b, and 50c, the branching unit control units 60a, 60b, and 60c, and the primary control unit 70 described above are connected wiredly or wirelessly to be mutually communicable so as to constitute a control unit 80. The control unit 80 accordingly controls behavior of the elements 21 (21a), 22, 36, 44, 46a, 48a, 51a, 51b, 51c, 53a, 53b, 53c (54a, 54b, 54c), 66a, 66b, 66c, 67a, 67b, 67c, 71 (71a), 72, 75 (75a), 76, 102, and 104a in accordance with detection information of the various sensors 37, 38, 39, 83, 84, 85, 86, 87, 88, 77, 78, 79, 81, 82, 58a, 58b, 58c, 59a, 59b, 59c, 121, 122, and the like, command information received from the remote controller (not depicted), and the like.

(9) Behavior of Refrigeration Cycle System

Behavior of the refrigeration cycle system 1 will be described next with reference to FIG. 3 to FIG. 6.

Refrigeration cycle operation of the refrigeration cycle system 1 can be divided principally into cooling operation, heating operation, mainly cooling operation, and mainly heating operation.

Herein, cooling operation corresponds to refrigeration cycle operation in a case where there are only utilization units each of which operates with the utilization heat exchanger functioning as a refrigerant evaporator, and the cascade heat exchanger 35 functions as a radiator for the secondary refrigerant with respect to evaporation loads of all the utilization units.

Heating operation corresponds to refrigeration cycle operation in a case where there are only utilization units each of which operates with the utilization heat exchanger functioning as a refrigerant radiator, and the cascade heat exchanger 35 functions as an evaporator for the secondary refrigerant with respect to radiation loads of all the utilization units.

During mainly cooling operation, there coexist a utilization unit operating with the utilization heat exchanger functioning as a refrigerant evaporator and a utilization unit operating with the utilization heat exchanger functioning as a refrigerant radiator. Mainly cooling operation corresponds to refrigeration cycle operation in a case where the cascade heat exchanger 35 functions as a radiator for the secondary refrigerant with respect to evaporation loads of all the utilization units principally occupying heat loads of all the utilization units.

During mainly heating operation, there coexist a utilization unit operating with the utilization heat exchanger functioning as a refrigerant evaporator, and a utilization unit operating with the utilization heat exchanger functioning as a refrigerant radiator. Mainly heating operation corresponds to refrigeration cycle operation in a case where the cascade heat exchanger 35 functions as an evaporator for the secondary refrigerant with respect to radiation loads of all the utilization units principally occupying heat loads of all the utilization units.

Behavior of the refrigeration cycle system 1 including these types of refrigeration cycle operation is executed by the control unit 80.

(9-1) Cooling Operation

Figure 3:
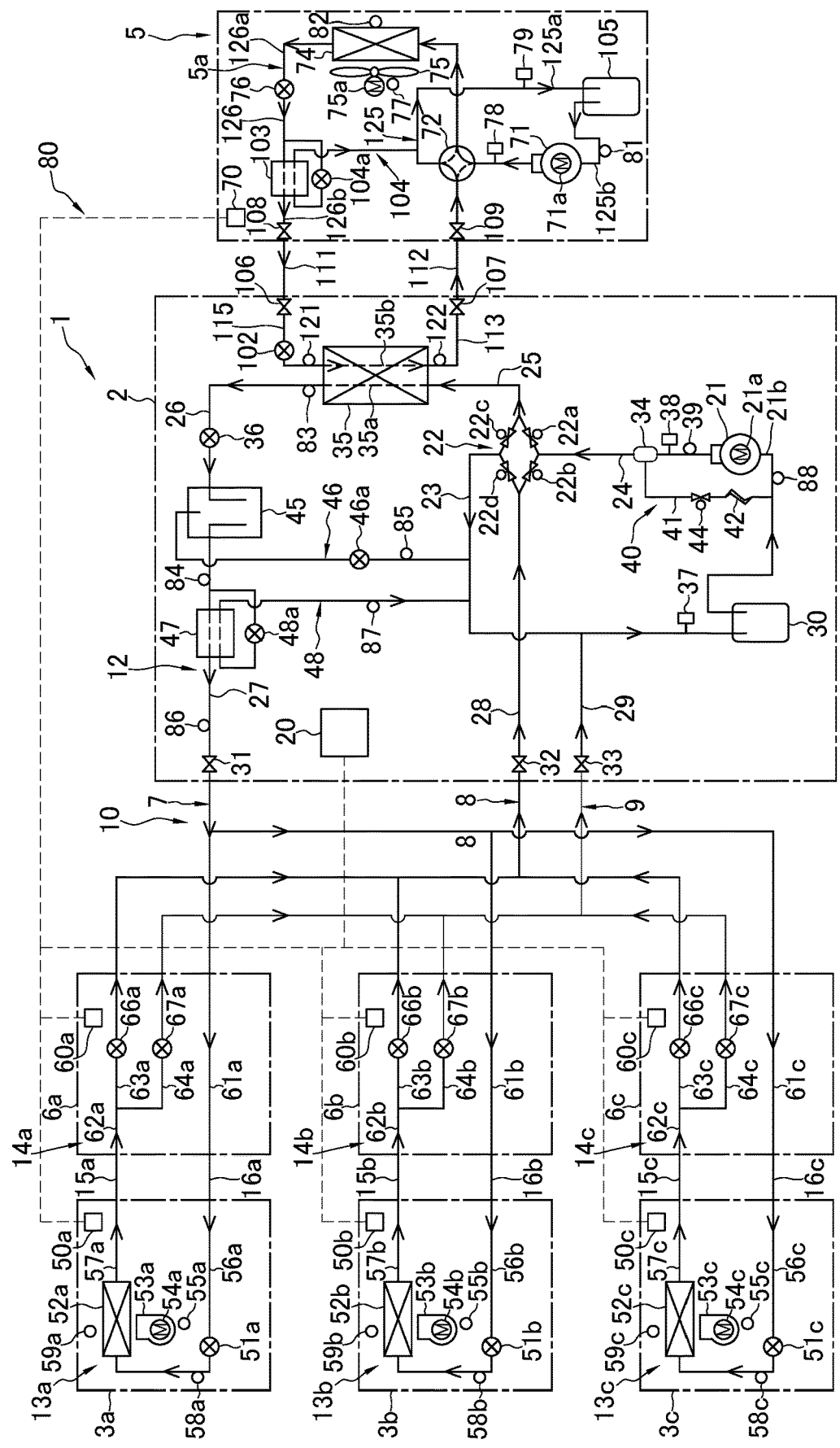
FIG. 3 is a view indicating behavior (a refrigerant flow) during cooling operation of the refrigeration cycle system.

During cooling operation, for example, each of the utilization heat exchangers 52a, 52b, and 52c in the utilization units 3a, 3b, and 3c functions as a refrigerant evaporator, and the cascade heat exchanger 35 functions as a radiator for the secondary refrigerant. During such cooling operation, the primary refrigerant circuit 5a and the secondary refrigerant circuit 10 in the refrigeration cycle system 1 are configured as depicted in FIG. 3. FIG. 3 includes arrows provided to the primary refrigerant circuit 5a and arrows provided to the secondary refrigerant circuit 10, which indicate refrigerant flows during cooling operation.

Specifically, in the primary unit 5, the primary switching mechanism 72 is switched into the fifth connection state to cause the cascade heat exchanger 35 to function as an evaporator for the primary refrigerant. The fifth connection state of the primary switching mechanism 72 is depicted by solid lines in the primary switching mechanism 72 in FIG. 3. Accordingly in the primary unit 5, the primary refrigerant discharged from the primary compressor 71 passes the primary switching mechanism 72 and exchanges heat with outdoor air supplied from the primary fan 75 in the primary heat exchanger 74 to be condensed. The primary refrigerant condensed in the primary heat exchanger 74 passes the primary first expansion valve 76 controlled into a fully opened state, and part of the refrigerant flows toward the first liquid shutoff valve 108 via the primary subcooling heat exchanger 103, and another part of the refrigerant branches into the primary subcooling circuit 104. The refrigerant flowing in the primary subcooling circuit 104 is decompressed while passing the primary subcooling expansion valve 104a. The refrigerant flowing from the primary first expansion valve 76 toward the first liquid shutoff valve 108 exchanges heat, in the primary subcooling heat exchanger 103, with the refrigerant decompressed at the primary subcooling expansion valve 104a and flowing in the primary subcooling circuit 104, so as to be cooled into a subcooled state. The refrigerant brought into the subcooled state flows in the order of the primary first connection pipe 111, the second liquid shutoff valve 106, and the first connecting pipe 115, and is decompressed at the primary second expansion valve 102. The refrigerant decompressed at the primary second expansion valve 102 exchanges heat with the secondary refrigerant flowing in the secondary flow path 35a to be evaporated while flowing in the primary flow path 35b of the cascade heat exchanger 35, and flows toward the second gas shutoff valve 107 via the second connecting pipe 113. The refrigerant having passed the second gas shutoff valve 107 passes the primary second connection pipe 112 and the first gas shutoff valve 109 to reach the primary switching mechanism 72. The refrigerant having passed the primary switching mechanism 72 joins, in the first suction flow path 125a, the refrigerant having flowed in the primary subcooling circuit 104, and is then sucked into the primary compressor 71 via the primary accumulator 105 and the second suction flow path 125b.

In the heat source unit 2, the secondary switching mechanism 22 is switched into the first connection state as well as the fourth connection state to cause the cascade heat exchanger 35 to function as a radiator for the secondary refrigerant. In the first connection state of the secondary switching mechanism 22, the first switching valve 22a is in the opened state and the third switching valve 22c is in the closed state. In the fourth connection state of the secondary switching mechanism 22, the fourth switching valve 22d is in the opened state and the second switching valve 22b is in the closed state. The heat source expansion valve 36 is controlled in opening degree. In the first to third utilization units 3a, 3b, and 3c, the first control valves 66a, 66b, and 66c and the second control valves 67a, 67b, and 67c are controlled into the opened state. Accordingly, each of the utilization heat exchangers 52a, 52b, and 52c in the utilization units 3a, 3b, and 3c functions as a refrigerant evaporator. All the utilization heat exchangers 52a, 52b, and 52c in the utilization units 3a, 3b, and 3c and the suction side of the secondary compressor 21 in the heat source unit 2 are connected via first utilization pipes 57a, 57b, and 57c, the first branching connecting tubes 15a, 15b, and 15c, junction pipes 62a, 62b, and 62c, first branching pipes 63a, 63b, and 63c, the second branching pipes 64a, 64b, and 64c, the secondary first connection pipe 8, and the secondary second connection pipe 9. The secondary subcooling expansion valve 48a is controlled in opening degree such that the secondary refrigerant flowing at the outlet of the secondary subcooling heat exchanger 47 toward the secondary third connection pipe 7 has a degree of subcooling at a predetermined value. The bypass expansion valve 46a is controlled into the closed state. In the utilization units 3a, 3b, and 3c, the utilization expansion valves 51a, 51b, and 51c are each controlled in opening degree.

In the secondary refrigerant circuit 10 in this state, a secondary high-pressure refrigerant compressed in and discharged from the secondary compressor 21 is sent to the secondary flow path 35a of the cascade heat exchanger 35 via the secondary switching mechanism 22. The secondary high-pressure refrigerant flowing in the secondary flow path 35a of the cascade heat exchanger 35 radiates heat, and the primary refrigerant flowing in the primary flow path 35b of the cascade heat exchanger 35 is evaporated. The secondary refrigerant having radiated heat in the cascade heat exchanger 35 passes the heat source expansion valve 36 controlled in opening degree, and then flows into the secondary receiver 45. Part of the refrigerant having flowed out of the secondary receiver 45 branches to the secondary subcooling circuit 48, is decompressed at the secondary subcooling expansion valve 48a, and then joins into the secondary suction flow path 23. In the secondary subcooling heat exchanger 47, another part of the refrigerant having flowed out of the secondary receiver 45 is cooled by the refrigerant flowing in the secondary subcooling circuit 48, and is then sent to the secondary third connection pipe 7 via the third shutoff valve 31.

The refrigerant sent to the secondary third connection pipe 7 is branched into three portions to pass the third branching pipes 61a, 61b, and 61c of the first to third branching units 6a, 6b, and 6c. Thereafter, the refrigerant having flowed in the second branching connecting tubes 16a, 16b, and 16c is sent to second utilization pipes 56a, 56b, and 56c of the first to third utilization units 3a, 3b, and 3c. The refrigerant sent to the second utilization pipes 56a, 56b, and 56c is sent to the utilization expansion valves 51a, 51b, and 51c in the utilization units 3a, 3b, and 3c.

The refrigerant having passed the utilization expansion valves 51a, 51b, and 51c each controlled in opening degree exchanges heat with indoor air supplied by the indoor fans 53a, 53b, and 53c in the utilization heat exchangers 52a, 52b, and 52c. The refrigerant flowing in the utilization heat exchangers 52a, 52b, and 52c is thus evaporated into a low-pressure gas refrigerant. Indoor air is cooled and is supplied into the indoor space. The indoor space is thus cooled. The low-pressure gas refrigerant evaporated in the utilization heat exchangers 52a, 52b, and 52c flows in the first utilization pipes 57a, 57b, and 57c, flows in the first branching connecting tubes 15a, 15b, and 15c, and is then sent to the junction pipes 62a, 62b, and 62c of the first to third branching units 6a, 6b, and 6c.

The low-pressure gas refrigerant sent to the junction pipes 62a, 62b, and 62c is branched into the first branching pipes 63a, 63b, and 63c, and the second branching pipes 64a, 64b, and 64c. The refrigerant having passed the first control valves 66a, 66b, and 66c on the first branching pipes 63a, 63b, and 63c is sent to the secondary first connection pipe 8. The refrigerant having passed the second control valves 67a, 67b, and 67c on the second branching pipes 64a, 64b, and 64c is sent to the secondary second connection pipe 9.

The low-pressure gas refrigerant sent to the secondary first connection pipe 8 and the secondary second connection pipe 9 is returned to the suction side of the secondary compressor 21 via the first shutoff valve 32, the second shutoff valve 33, the first heat source pipe 28, the second heat source pipe 29, the secondary switching mechanism 22, the secondary suction flow path 23, and the secondary accumulator 30.

Behavior during cooling operation is executed in this manner.

(9-2) Heating Operation

Figure 4:
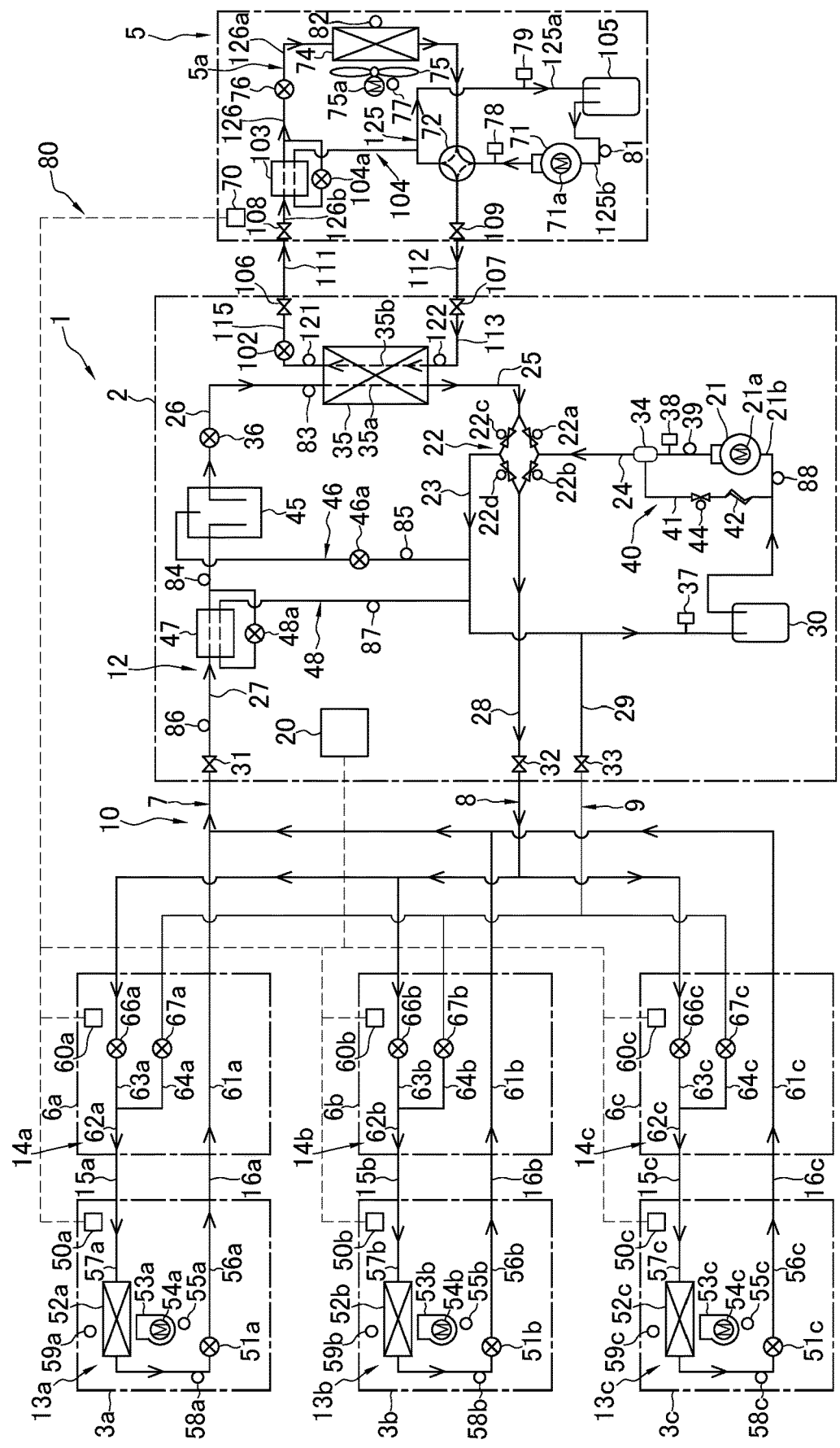
FIG. 4 is a view indicating behavior (a refrigerant flow) during heating operation of the refrigeration cycle system.

During heating operation, each of the utilization heat exchangers 52a, 52b, and 52c in the utilization units 3a, 3b, and 3c functions as a refrigerant radiator. Furthermore, during heating operation, the cascade heat exchanger 35 functions as an evaporator for the secondary refrigerant. During heating operation, the primary refrigerant circuit 5a and the secondary refrigerant circuit 10 in the refrigeration cycle system 1 are configured as depicted in FIG. 4. FIG. 4 includes arrows provided to the primary refrigerant circuit 5a and arrows provided to the secondary refrigerant circuit 10, which indicate refrigerant flows during heating operation.

Specifically, in the primary unit 5, the primary switching mechanism 72 is switched into a sixth connection state to cause the cascade heat exchanger 35 to function as a radiator for the primary refrigerant. The sixth connection state of the primary switching mechanism 72 corresponds to a connection state depicted by broken lines in the primary switching mechanism 72 in FIG. 4. Accordingly in the primary unit 5, the primary refrigerant discharged from the primary compressor 71, having passed the primary switching mechanism 72 and the first gas shutoff valve 109 passes the primary second connection pipe 112 and the second gas shutoff valve 107 to be sent to the primary flow path 35b of the cascade heat exchanger 35. The refrigerant flowing in the primary flow path 35b of the cascade heat exchanger 35 exchanges heat with the secondary refrigerant flowing in the secondary flow path 35a to be condensed. The primary refrigerant condensed in the cascade heat exchanger 35 flows in the order of the first connecting pipe 115, the primary second expansion valve 102 controlled into the fully opened state, the second liquid shutoff valve 106, the primary first connection pipe 111, the first liquid shutoff valve 108, and the primary subcooling heat exchanger 103, and is decompressed at the primary first expansion valve 76. During heating operation, the primary subcooling expansion valve 104a is controlled into the closed state. Accordingly, the refrigerant does not flow to the primary subcooling circuit 104 and does not exchange heat in the primary subcooling heat exchanger 103. The valve opening degree of the primary first expansion valve 76 is controlled such that, for example, the refrigerant sucked into the primary compressor 71 has a degree of superheating at a predetermined value. The refrigerant decompressed at the primary first expansion valve 76 exchanges heat with outdoor air supplied from the primary fan 75 in the primary heat exchanger 74 to be evaporated, and is sucked into the primary compressor 71 via the primary switching mechanism 72 and the primary accumulator 105.

In the heat source unit 2, the secondary switching mechanism 22 is switched into the second connection state as well as the third connection state. The cascade heat exchanger 35 thus functions as an evaporator for the secondary refrigerant. In the second connection state of the secondary switching mechanism 22, the first switching valve 22a is in the closed state and the third switching valve 22c is in the opened state. In the third connection state of the secondary switching mechanism 22, the second switching valve 22b is in the opened state and the fourth switching valve 22d is in the closed state. The heat source expansion valve 36 is controlled in opening degree. In the first to third branching units 6a, 6b, and 6c, the first control valves 66a, 66b, and 66c are controlled into the opened state, and the second control valves 67a, 67b, and 67c are controlled into the closed state. Accordingly, each of the utilization heat exchangers 52a, 52b, and 52c in the utilization units 3a, 3b, and 3c functions as a refrigerant radiator. The utilization heat exchangers 52a, 52b, and 52c in the utilization units 3a, 3b, and 3c and the discharge side of the secondary compressor 21 in the heat source unit 2 are connected via the discharge flow path 24, the first heat source pipe 28, the secondary first connection pipe 8, the first branching pipes 63a, 63b, and 63c, the junction pipes 62a, 62b, and 62c, the first branching connecting tubes 15a, 15b, and 15c, and the first utilization pipes 57a, 57b, and 57c. The secondary subcooling expansion valve 48a and the bypass expansion valve 46a are controlled into the closed state. In the utilization units 3a, 3b, and 3c, the utilization expansion valves 51a, 51b, and 51c are each controlled in opening degree.

In the secondary refrigerant circuit 10 in this state, a high-pressure refrigerant compressed in and discharged from the secondary compressor 21 is sent to the first heat source pipe 28 via the second switching valve 22b controlled into the opened state in the secondary switching mechanism 22. The refrigerant sent to the first heat source pipe 28 is sent to the secondary first connection pipe 8 via the first shutoff valve 32.

The high-pressure refrigerant sent to the secondary first connection pipe 8 is branched into three portions to be sent to the first branching pipes 63a, 63b, and 63c in the utilization units 3a, 3b, and 3c in operation. The high-pressure refrigerant sent to the first branching pipes 63a, 63b, and 63c passes the first control valves 66a, 66b, and 66c, and flows in the junction pipes 62a, 62b, and 62c. The refrigerant having flowed in the first branching connecting tubes 15a, 15b, and 15c and the first utilization pipes 57a, 57b, and 57c is then sent to the utilization heat exchangers 52a, 52b, and 52c.

The high-pressure refrigerant sent to the utilization heat exchangers 52a, 52b, and 52c exchanges heat with indoor air supplied by the indoor fans 53a, 53b, and 53c in the utilization heat exchangers 52a, 52b, and 52c. The refrigerant flowing in the utilization heat exchangers 52a, 52b, and 52c thus radiates heat. Indoor air is heated and is supplied into the indoor space. The indoor space is thus heated. The refrigerant having radiated heat in the utilization heat exchangers 52a, 52b, and 52c flows in the second utilization pipes 56a, 56b, and 56c and passes the utilization expansion valves 51a, 51b, and 51c each controlled in opening degree. Thereafter, the refrigerant having flowed in the second branching connecting tubes 16a, 16b, and 16c flows in the third branching pipes 61a, 61b, and 61c of the branching units 6a, 6b, and 6c.

The refrigerant sent to the third branching pipes 61a, 61b, and 61c is sent to the secondary third connection pipe 7 to join.

The refrigerant sent to the secondary third connection pipe 7 is sent to the heat source expansion valve 36 via the third shutoff valve 31. The refrigerant sent to the heat source expansion valve 36 is controlled in flow rate at the heat source expansion valve 36 and is then sent to the cascade heat exchanger 35. In the cascade heat exchanger 35, the secondary refrigerant flowing in the secondary flow path 35a is evaporated into a low-pressure gas refrigerant and is sent to the secondary switching mechanism 22, and the primary refrigerant flowing in the primary flow path 35b of the cascade heat exchanger 35 is condensed. The secondary low-pressure gas refrigerant sent to the secondary switching mechanism 22 is returned to the suction side of the secondary compressor 21 via the secondary suction flow path 23 and the secondary accumulator 30.

Behavior during heating operation is executed in this manner.

(9-3) Mainly Cooling Operation

Figure 5:
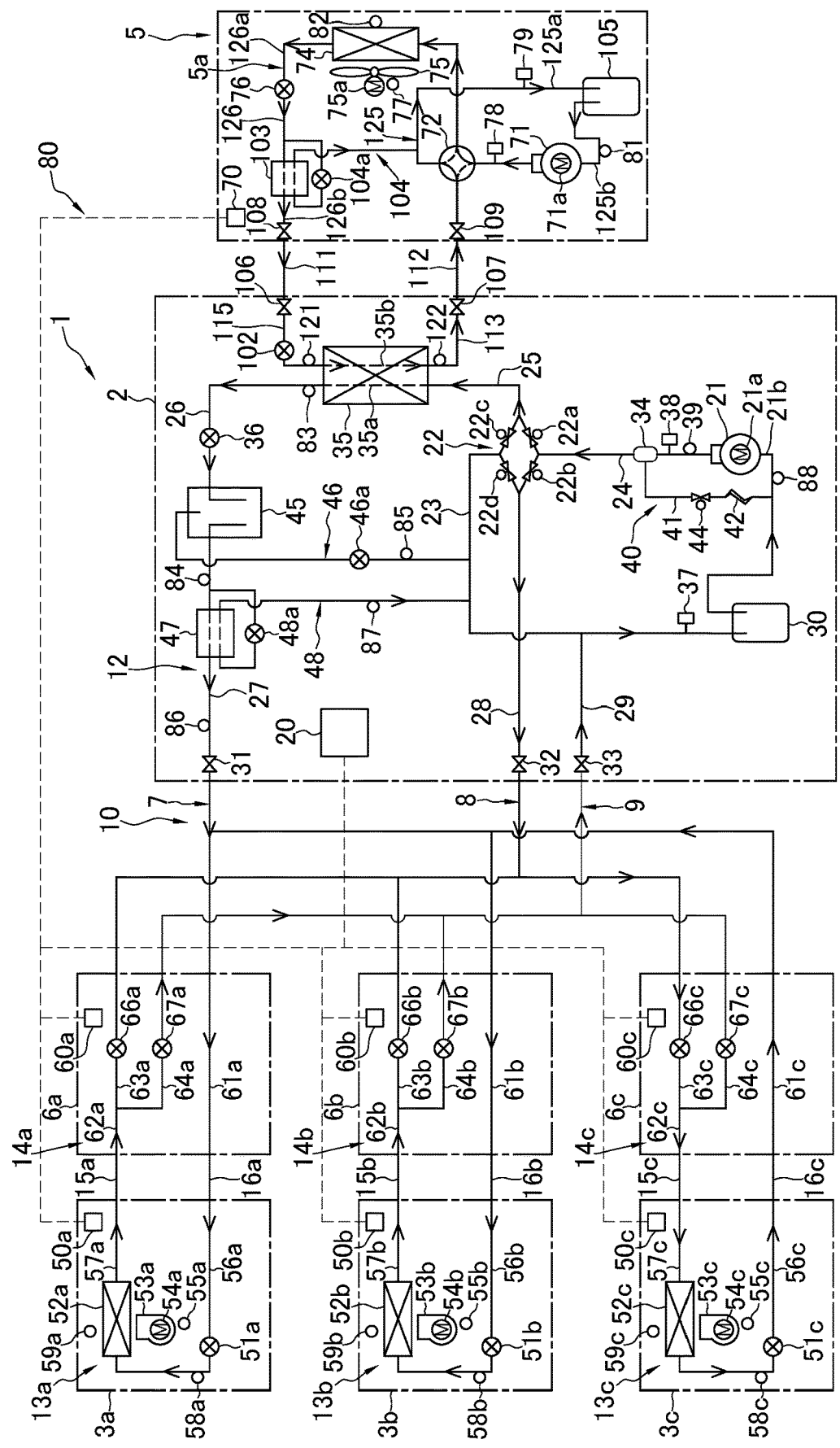
FIG. 5 is a view indicating behavior (a refrigerant flow) during simultaneous cooling and heating operation (mainly cooling) of the refrigeration cycle system.

During mainly cooling operation, for example, the utilization heat exchangers 52a and 52b in the utilization units 3a and 3b each function as a refrigerant evaporator, and the utilization heat exchanger 52c in the utilization unit 3c functions as a refrigerant radiator. During mainly cooling operation, the cascade heat exchanger 35 functions as a radiator for the secondary refrigerant. During mainly cooling operation, the primary refrigerant circuit 5a and the secondary refrigerant circuit 10 in the refrigeration cycle system 1 are configured as depicted in FIG. 5. FIG. 5 includes arrows provided to the primary refrigerant circuit 5a and arrows provided to the secondary refrigerant circuit 10, which indicate refrigerant flows during mainly cooling operation.

Specifically, in the primary unit 5, the primary switching mechanism 72 is switched into the fifth connection state (the state depicted by solid lines in the primary switching mechanism 72 in FIG. 5) to cause the cascade heat exchanger 35 to function as an evaporator for the primary refrigerant. Accordingly in the primary unit 5, the primary refrigerant discharged from the primary compressor 71 passes the primary switching mechanism 72 and exchanges heat with outdoor air supplied from the primary fan 75 in the primary heat exchanger 74 to be condensed. The primary refrigerant condensed in the primary heat exchanger 74 passes the primary first expansion valve 76 controlled into a fully opened state, and part of the refrigerant flows toward the first liquid shutoff valve 108 via the primary subcooling heat exchanger 103, and another part of the refrigerant branches into the primary subcooling circuit 104. The refrigerant flowing in the primary subcooling circuit 104 is decompressed while passing the primary subcooling expansion valve 104a. The refrigerant flowing from the primary first expansion valve 76 toward the first liquid shutoff valve 108 exchanges heat, in the primary subcooling heat exchanger 103, with the refrigerant decompressed at the primary subcooling expansion valve 104a and flowing in the primary subcooling circuit 104, so as to be cooled into a subcooled state. The refrigerant brought into the subcooled state flows in the order of the primary first connection pipe 111, the second liquid shutoff valve 106, and the first connecting pipe 115, and is decompressed at the primary second expansion valve 102. The refrigerant decompressed at the primary second expansion valve 102 exchanges heat with the secondary refrigerant flowing in the secondary flow path 35a to be evaporated while flowing in the primary flow path 35b of the cascade heat exchanger 35, and flows toward the second gas shutoff valve 107 via the second connecting pipe 113. The refrigerant having passed the second gas shutoff valve 107 passes the primary second connection pipe 112 and the first gas shutoff valve 109 to reach the primary switching mechanism 72. The refrigerant having passed the primary switching mechanism 72 joins, in the first suction flow path 125a, the refrigerant having flowed in the primary subcooling circuit 104, and is then sucked into the primary compressor 71 via the primary accumulator 105 and the second suction flow path 125b.

In the heat source unit 2, the secondary switching mechanism 22 is switched into the first connection state (the first switching valve 22a is in the opened state and the third switching valve 22c is in the closed state) as well as the third connection state (the second switching valve 22b is in the opened state and the fourth switching valve 22d is in the closed state) to cause the cascade heat exchanger 35 to function as a radiator for the secondary refrigerant. The heat source expansion valve 36 is controlled in opening degree. In the first to third branching units 6a, 6b, and 6c, the first control valve 66c and the second control valves 67a and 67b are controlled into the opened state, and the first control valves 66a and 66b and the second control valve 67c are controlled into the closed state. Accordingly, the utilization heat exchangers 52a and 52b in the utilization units 3a and 3b each function as a refrigerant evaporator, and the utilization heat exchanger 52c in the utilization unit 3c functions as a refrigerant radiator. The utilization heat exchangers 52a and 52b in the utilization units 3a and 3b and the suction side of the secondary compressor 21 in the heat source unit 2 are connected via the secondary second connection pipe 9, and the utilization heat exchanger 52c in the utilization unit 3c and the discharge side of the secondary compressor 21 in the heat source unit 2 are connected via the secondary first connection pipe 8. The secondary subcooling expansion valve 48a is controlled in opening degree such that the secondary refrigerant flowing at the outlet of the secondary subcooling heat exchanger 47 toward the secondary third connection pipe 7 has a degree of subcooling at a predetermined value. The bypass expansion valve 46a is controlled into the closed state. In the utilization units 3a, 3b, and 3c, the utilization expansion valves 51a, 51b, and 51c are each controlled in opening degree.

In the secondary refrigerant circuit 10 in this state, part of the secondary high-pressure refrigerant compressed in and discharged from the secondary compressor 21 is sent to the secondary first connection pipe 8 via the secondary switching mechanism 22, the first heat source pipe 28, and the first shutoff valve 32, and the remaining is sent to the secondary flow path 35a of the cascade heat exchanger 35 via the secondary switching mechanism 22 and the third heat source pipe 25.

The high-pressure refrigerant sent to the secondary first connection pipe 8 is sent to the first branching pipe 63c. The high-pressure refrigerant sent to the first branching pipe 63c is sent to the utilization heat exchanger 52c in the utilization unit 3c via the first control valve 66c and the junction pipe 62c.

The high-pressure refrigerant sent to the utilization heat exchanger 52c exchanges heat with indoor air supplied by the indoor fan 53c in the utilization heat exchanger 52c. The refrigerant flowing in the utilization heat exchanger 52c thus radiates heat. Indoor air is heated and is supplied into the indoor space, and the utilization unit 3c executes heating operation. The refrigerant having radiated heat in the utilization heat exchanger 52c flows in the second utilization pipe 56c and is controlled in flow rate at the utilization expansion valve 51c. The refrigerant having flowed in the second branching connecting tube 16c is thereafter sent to the third branching pipe 61c in the branching unit 6c.

The refrigerant sent to the third branching pipe 61c is sent to the secondary third connection pipe 7.

The high-pressure refrigerant sent to the secondary flow path 35a of the cascade heat exchanger 35 exchanges heat with the primary refrigerant flowing in the primary flow path 35b in the cascade heat exchanger 35 to radiate heat. The secondary refrigerant having radiated heat in the cascade heat exchanger 35 is controlled in flow rate at the heat source expansion valve 36 and then flows into the secondary receiver 45. Part of the refrigerant having flowed out of the secondary receiver 45 branches to the secondary subcooling circuit 48, is decompressed at the secondary subcooling expansion valve 48a, and then joins into the secondary suction flow path 23. In the secondary subcooling heat exchanger 47, another part of the refrigerant having flowed out of the secondary receiver 45 is cooled by the refrigerant flowing in the secondary subcooling circuit 48, is then sent to the secondary third connection pipe 7 via the third shutoff valve 31, and joins the refrigerant having radiated heat in the utilization heat exchanger 52c.

The refrigerant having joined in the secondary third connection pipe 7 is branched into two portions to be sent to the third branching pipes 61a and 61b of the branching units 6a and 6b. Thereafter, the refrigerant having flowed in the second branching connecting tubes 16a and 16b is sent to the second utilization pipes 56a and 56b of the first and second utilization units 3a and 3b. The refrigerant flowing in the second utilization pipes 56a and 56b passes the utilization expansion valves 51a and 51b in the utilization units 3a and 3b.

The refrigerant having passed the utilization expansion valves 51a and 51b each controlled in opening degree exchanges heat with indoor air supplied by the indoor fans 53a and 53b in the utilization heat exchangers 52a and 52b. The refrigerant flowing in the utilization heat exchangers 52a and 52b is thus evaporated into a low-pressure gas refrigerant. Indoor air is cooled and is supplied into the indoor space. The indoor space is thus cooled. The low-pressure gas refrigerant evaporated in the utilization heat exchangers 52a and 52b is sent to the junction pipes 62a and 62b of the first and second branching units 6a and 6b.

The low-pressure gas refrigerant sent to the junction pipes 62a and 62b is sent to the secondary second connection pipe 9 via the second control valves 67a and 67b and the second branching pipes 64a and 64b, to join.

The low-pressure gas refrigerant sent to the secondary second connection pipe 9 is returned to the suction side of the secondary compressor 21 via the second shutoff valve 33, the second heat source pipe 29, the secondary suction flow path 23, and the secondary accumulator 30.

Behavior during mainly cooling operation is executed in this manner.

(9-4) Mainly Heating Operation

Figure 6:
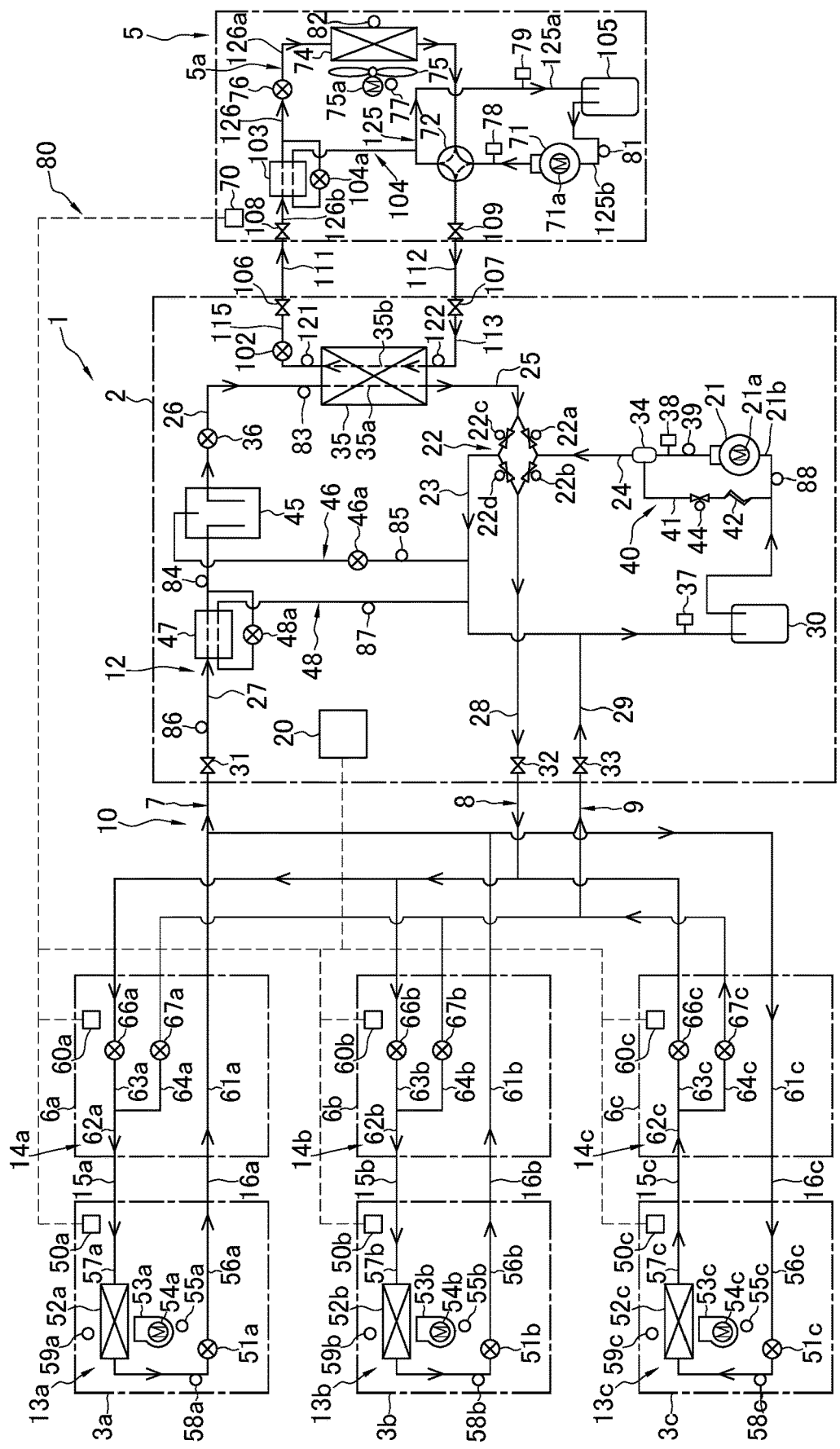
FIG. 6 is a view indicating behavior (a refrigerant flow) during simultaneous cooling and heating operation (mainly heating) of the refrigeration cycle system.

During mainly heating operation, for example, the utilization heat exchangers 52a and 52b in the utilization units 3a and 3b each function as a refrigerant radiator, and the utilization heat exchanger 52c functions as a refrigerant evaporator. During mainly heating operation, the cascade heat exchanger 35 functions as an evaporator for the secondary refrigerant. During mainly heating operation, the primary refrigerant circuit 5a and the secondary refrigerant circuit 10 in the refrigeration cycle system 1 are configured as depicted in FIG. 6. FIG. 6 includes arrows provided to the primary refrigerant circuit 5a and arrows provided to the secondary refrigerant circuit 10, which indicate refrigerant flows during mainly heating operation.

Specifically, in the primary unit 5, the primary switching mechanism 72 is switched into a sixth connection state to cause the cascade heat exchanger 35 to function as a radiator for the primary refrigerant. The sixth connection state of the primary switching mechanism 72 corresponds to a connection state depicted by broken lines in the primary switching mechanism 72 in FIG. 6. Accordingly in the primary unit 5, the primary refrigerant discharged from the primary compressor 71, having passed the primary switching mechanism 72 and the first gas shutoff valve 109 passes the primary second connection pipe 112 and the second gas shutoff valve 107 to be sent to the primary flow path 35b of the cascade heat exchanger 35. The refrigerant flowing in the primary flow path 35b of the cascade heat exchanger 35 exchanges heat with the secondary refrigerant flowing in the secondary flow path 35a to be condensed. The primary refrigerant condensed in the cascade heat exchanger 35 flows in the order of the first connecting pipe 115, the primary second expansion valve 102 controlled into the fully opened state, the second liquid shutoff valve 106, the primary first connection pipe 111, the first liquid shutoff valve 108, and the primary subcooling heat exchanger 103, and is decompressed at the primary first expansion valve 76. During mainly heating operation, the primary subcooling expansion valve 104a is controlled into the closed state. Accordingly, the refrigerant does not flow to the primary subcooling circuit 104 and does not exchange heat in the primary subcooling heat exchanger 103. The valve opening degree of the primary first expansion valve 76 is controlled such that, for example, the refrigerant sucked into the primary compressor 71 has a degree of superheating at a predetermined valve. The refrigerant decompressed at the primary first expansion valve 76 exchanges heat with outdoor air supplied from the primary fan 75 in the primary heat exchanger 74 to be evaporated, and is sucked into the primary compressor 71 via the primary switching mechanism 72 and the primary accumulator 105.

In the heat source unit 2, the secondary switching mechanism 22 is switched into the second connection state as well as the third connection state. In the second connection state of the secondary switching mechanism 22, the first switching valve 22a is in the closed state and the third switching valve 22c is in the opened state. In the third connection state of the secondary switching mechanism 22, the second switching valve 22b is in the opened state and the fourth switching valve 22d is in the closed state. The cascade heat exchanger 35 thus functions as an evaporator for the secondary refrigerant. The heat source expansion valve 36 is controlled in opening degree. In the first to third branching units 6a, 6b, and 6c, the first control valves 66a and 66b and the second control valve 67c are controlled into the opened state, and the first control valve 66c and the second control valves 67a and 67b are controlled into the closed state. Accordingly, the utilization heat exchangers 52a and 52b in the utilization units 3a and 3b each function as a refrigerant radiator, and the utilization heat exchanger 52c in the utilization unit 3c functions as a refrigerant evaporator. The utilization heat exchanger 52c in the utilization unit 3c and the suction side of the secondary compressor 21 in the heat source unit 2 are connected via the first utilization pipe 57c, the first branching connecting tube 15c, the junction pipe 62c, the second branching pipe 64c, and the secondary second connection pipe 9. The utilization heat exchangers 52a and 52b in the utilization units 3a and 3b and the discharge side of the secondary compressor 21 in the heat source unit 2 are connected via the discharge flow path 24, the first heat source pipe 28, the secondary first connection pipe 8, the first branching pipes 63a and 63b, the junction pipes 62a and 62b, the first branching connecting tubes 15a and 15b, and the first utilization pipes 57a and 57b. The secondary subcooling expansion valve 48a and the bypass expansion valve 46a are controlled into the closed state. In the utilization units 3a, 3b, and 3c, the utilization expansion valves 51a, 51b, and 51c are each controlled in opening degree.

In the secondary refrigerant circuit 10 in this state, a secondary high-pressure refrigerant compressed in and discharged from the secondary compressor 21 is sent to the secondary first connection pipe 8 via the secondary switching mechanism 22, the first heat source pipe 28, and the first shutoff valve 32.

The high-pressure refrigerant sent to the secondary first connection pipe 8 is branched into two portions to be sent to the first branching pipes 63a and 63b of the first branching unit 6a and the second branching unit 6b respectively connected to the first utilization unit 3a and the second utilization unit 3b in operation. The high pressure refrigerant sent to the first branching pipes 63a and 63b is sent to the utilization heat exchangers 52a and 52b in the first and second utilization units 3a and 3b via the first control valves 66a and 66b, the junction pipes 62a and 62b, and the first branching connecting tubes 15a and 15b.

The high-pressure refrigerant sent to the utilization heat exchangers 52a and 52b exchanges heat with indoor air supplied by the indoor fans 53a and 53b in the utilization heat exchangers 52a and 52b. The refrigerant flowing in the utilization heat exchangers 52a and 52b thus radiates heat. Indoor air is heated and is supplied into the indoor space. The indoor space is thus heated. The refrigerant having radiated heat in the utilization heat exchangers 52a and 52b flows in the second utilization pipes 56a and 56b, and passes the utilization expansion valves 51a and 51b each controlled in opening degree. Thereafter, the refrigerant having flowed in the second branching connecting tubes 16a and 16b is sent to the secondary third connection pipe 7 via the third branching pipes 61a and 61b of the branching units 6a and 6b.

Part of the refrigerant sent to the secondary third connection pipe 7 is sent to the third branching pipe 61c of the branching unit 6c, and the remaining is sent to the heat source expansion valve 36 via the third shutoff valve 31.

The refrigerant sent to the third branching pipe 61c flows in the second utilization pipe 56c of the utilization unit 3c via the second branching connecting tube 16c, and is sent to the utilization expansion valve 51c.

The refrigerant having passed the utilization expansion valve 51c controlled in opening degree exchanges heat with indoor air supplied by the indoor fan 53c in the utilization heat exchanger 52c. The refrigerant flowing in the utilization heat exchanger 52c is thus evaporated into a low-pressure gas refrigerant. Indoor air is cooled and is supplied into the indoor space. The indoor space is thus cooled. The low-pressure gas refrigerant evaporated in the utilization heat exchanger 52c passes the first utilization pipe 57c and the first branching connecting tube 15c to be sent to the junction pipe 62c.

The low-pressure gas refrigerant sent to the junction pipe 62c is sent to the secondary second connection pipe 9 via the second control valve 67c and the second branching pipe 64c.

The low-pressure gas refrigerant sent to the secondary second connection pipe 9 is returned to the suction side of the secondary compressor 21 via the second shutoff valve 33, the second heat source pipe 29, the secondary suction flow path 23, and the secondary accumulator 30.

The refrigerant sent to the heat source expansion valve 36 passes the heat source expansion valve 36 controlled in opening degree, and then exchanges heat with the primary refrigerant flowing in the primary flow path 35b in the secondary flow path 35a of the cascade heat exchanger 35. The refrigerant flowing in the secondary flow path 35a of the cascade heat exchanger 35 is evaporated into a low-pressure gas refrigerant and is sent to the secondary switching mechanism 22. The low-pressure gas refrigerant sent to the secondary switching mechanism 22 joins, in the secondary suction flow path 23, the low-pressure gas refrigerant evaporated in the utilization heat exchanger 52c. The refrigerant thus joined is returned to the suction side of the secondary compressor 21 via the secondary accumulator 30.

Behavior during mainly heating operation is executed in this manner.

(10) Excessive Refrigerant Control

Figure 7:
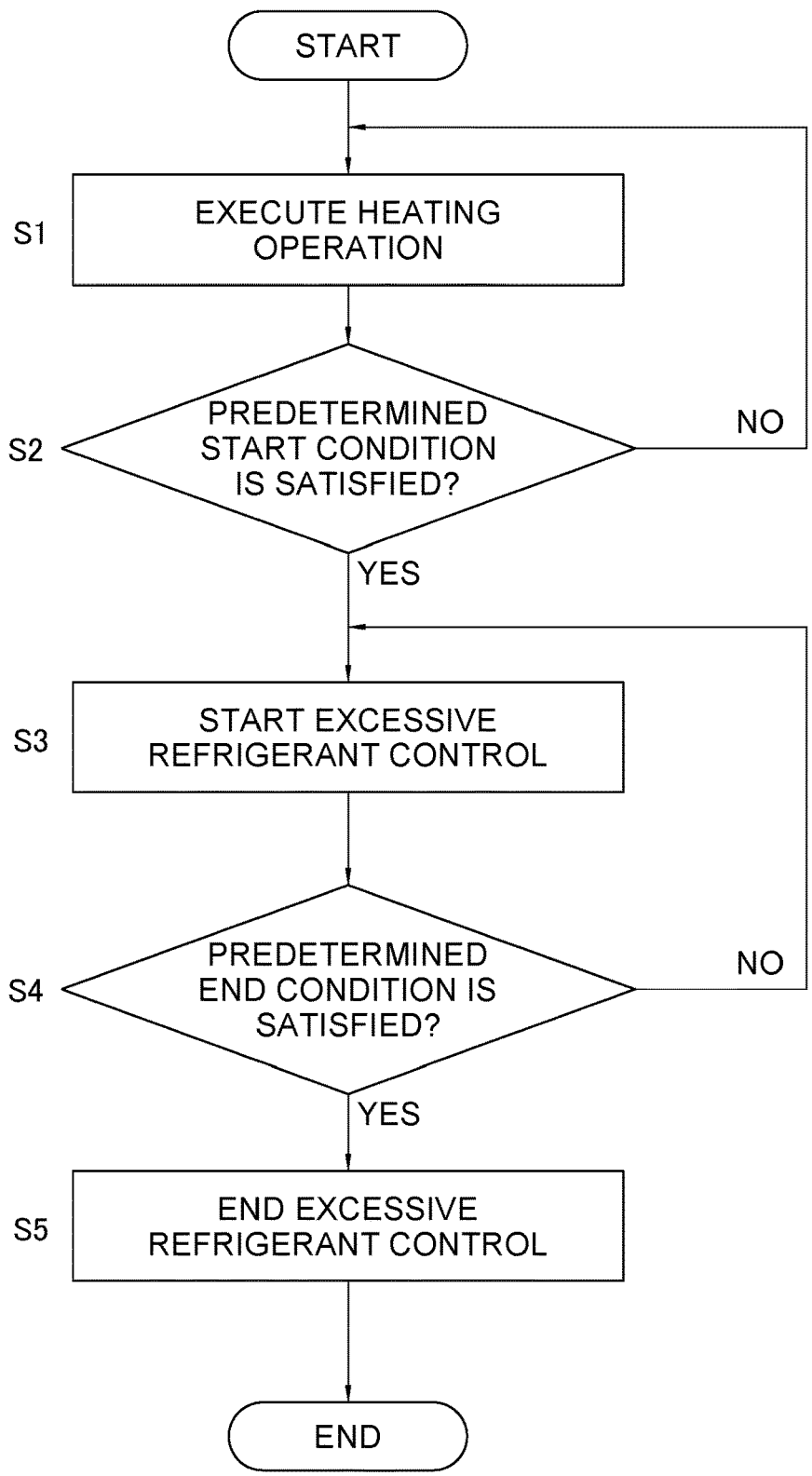
FIG. 7 is a flowchart of excessive refrigerant control.

FIG. 7 is a flowchart of excessive refrigerant control.

Excessive refrigerant control is executed to inhibit deterioration in heat exchange efficiency in the cascade heat exchanger 35 due to retention of the primary refrigerant in the liquid state in the primary flow path 35b of the cascade heat exchanger 35. Excessive refrigerant control according to the present embodiment is executed if a predetermined start condition is satisfied during heating operation or mainly heating operation.

Figure 8:
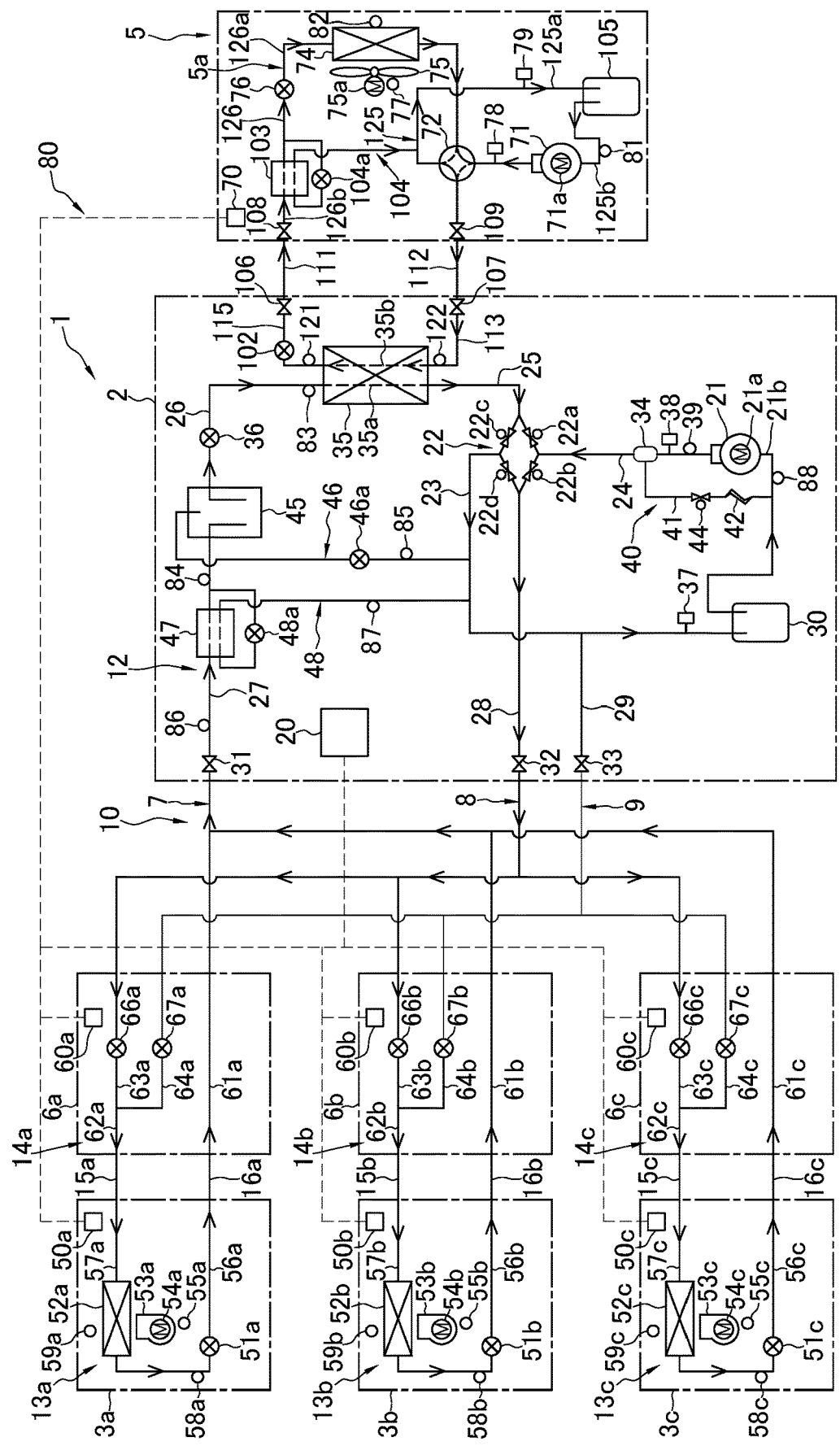
FIG. 8 is a view indicating behavior (a refrigerant flow) during excessive refrigerant control in the refrigeration cycle system.

Exemplarily described below is excessive refrigerant control executed if the predetermined condition is satisfied during heating operation. FIG. 8 depicts a state where the primary refrigerant and the secondary refrigerant flowing in the refrigeration cycle system 1 during excessive refrigerant control.

In step S1, the control unit 80 executes heating operation in the refrigeration cycle system 1.

In the primary refrigerant circuit 5a, the primary control unit 70 in the control unit 80 controls the elements of the primary unit 5. In this case, the primary control unit 70 controls the number of revolutions of the primary compressor 71 such that condensation temperature of the primary refrigerant condensed in the primary flow path 35b of the cascade heat exchanger 35 reaches a predetermined condensation temperature target value. Specifically, the primary control unit 70 controls the number of revolutions of the primary compressor 71 such that saturation temperature of the primary refrigerant corresponding to pressure of the primary refrigerant detected by the primary discharge pressure sensor 78 reaches the predetermined condensation temperature target value. Furthermore, the primary control unit 70 controls the primary second expansion valve 102 into the fully opened state, and controls the primary subcooling expansion valve 104a into the closed state. Moreover, the primary control unit 70 controls the valve opening degree of the primary first expansion valve 76 such that a degree of superheating of the primary refrigerant sucked into the primary compressor 71 reaches a predetermined value. Specifically, the primary control unit 70 controls the primary first expansion valve 76 such that the degree of superheating obtained by subtracting saturation temperature of the primary refrigerant corresponding to pressure of the primary refrigerant detected by the primary suction pressure sensor 79 from temperature of the primary refrigerant detected by the primary suction temperature sensor 81 reaches the predetermined value.

In the secondary refrigerant circuit 10, the heat source control unit 20 in the control unit 80 controls the elements of the heat source unit 2, the branching unit control units 60a, 60b, and 60c in the control unit 80 control the elements of the branching units 6a, 6b, and 6c, and the utilization control units 50a, 50b, and 50c in the control unit 80 control the elements of the utilization units 3a, 3b, and 3c. The heat source control unit 20 controls the number of revolutions of the secondary compressor 21 so as to reach the number of revolutions according to a radiation load in each of the utilization heat exchangers 52a, 52b, and 52c. Furthermore, the heat source control unit 20 controls the secondary subcooling expansion valve 48a and the bypass expansion valve 46a into the closed state. Moreover, the heat source control unit 20 controls the valve opening degree of the heat source expansion valve 36 such that a degree of superheating of the secondary refrigerant sucked into the secondary compressor 21 reaches a predetermined value. Specifically, the heat source control unit 20 controls the heat source expansion valve 36 such that the degree of superheating obtained by subtracting saturation temperature of the secondary refrigerant corresponding to pressure of the secondary refrigerant detected by the secondary suction pressure sensor 37 from temperature of the secondary refrigerant detected by the secondary suction temperature sensor 88 reaches the predetermined value. The branching unit control units 60a, 60b, and 60c control the first control valves 66a, 66b, and 66c into the opened state, and control the second control valves 67a, 67b, and 67c into the closed state. The utilization control units 50*a*, 50*b*, and 50*c* control the opening degrees of the utilization expansion valves 51*a*, 51*b*, and 51*c*.

In step S2, the control unit 80 determines whether or not the refrigeration cycle system 1 satisfies the predetermined start condition. The predetermined start condition is provided for determination of whether or not the primary refrigerant in the liquid state is retained in the primary flow path 35*b* of the cascade heat exchanger 35. It is determined in the present embodiment that the predetermined start condition is satisfied when a degree of subcooling of the primary refrigerant flowing at an outlet of the primary flow path 35*b* of the cascade heat exchanger 35 is equal to or more than a predetermined value. Specifically, the heat source control unit 20 in the control unit 80 determines whether or not a degree of subcooling obtained by subtracting temperature of the primary refrigerant detected by the primary first temperature sensor 121 from condensation temperature of the primary refrigerant in the primary flow path 35*b* of the cascade heat exchanger 35 is equal to or more than the predetermined value. The heat source control unit 20 according to the present embodiment receives from the primary control unit 70 information on pressure detected by the primary discharge pressure sensor 78, to find saturation temperature of the primary refrigerant corresponding to the pressure in the information as condensation temperature of the primary refrigerant. The flow proceeds to step S3 if it is determined that the predetermined start condition is satisfied, whereas step S2 is continued if it is determined that the predetermined start condition is not satisfied.

In step S3, the control unit 80 starts excessive refrigerant control. Upon excessive refrigerant control, in the control unit 80, the primary control unit 70, which has received information indicating satisfaction of the predetermined start condition transmitted from the heat source control unit 20, controls the valve opening degree of the primary subcooling expansion valve 104*a* from the closed state into the fully opened state.

In step S4, the control unit 80 determines whether or not the refrigeration cycle system 1 satisfies a predetermined end condition. The predetermined end condition is provided for determination of whether or not retention of the primary refrigerant in the liquid state is improved in the primary flow path 35*b* of the cascade heat exchanger 35. It is determined in the present embodiment that the predetermined end condition is satisfied when the degree of subcooling of the primary refrigerant flowing at the outlet of the primary flow path 35*b* of the cascade heat exchanger 35 is less than a predetermined value. The predetermined value for the predetermined end condition can be less than the predetermined value for the predetermined start condition. The degree of subcooling of the primary refrigerant flowing at the outlet of the primary flow path 35*b* is determined as in step S2. The flow proceeds to step S5 if it is determined that the predetermined end condition is satisfied, whereas step S3 is continued if it is determined that the predetermined end condition is not satisfied.

In step S5, the control unit 80 ends excessive refrigerant control. Specifically, the primary control unit 70 in the control unit 80 controls the valve opening degree of the primary subcooling expansion valve 104*a* into the closed state. The refrigeration cycle system 1 accordingly returns to an operating state prior to execution of excessive refrigerant control.

(11) Characteristics of Embodiment

In a refrigeration cycle system achieving the binary refrigeration cycle, a cascade heat exchanger constituted by a plate heat exchanger or the like causes heat exchange between the primary refrigerant and the secondary refrigerant. In an exemplary case where the secondary refrigerant flowing into the cascade heat exchanger is decreased in temperature and the primary refrigerant is increased in degree of subcooling in the cascade heat exchanger due to variation in load or the like on a utilization side, a liquid refrigerant occupies a region having larger proportion in an entire primary flow path of the cascade heat exchanger. This decreases a region enabling phase change of the primary refrigerant by heat exchange with the secondary refrigerant in the cascade heat exchanger, to lower heat exchange efficiency. In this case, a primary gas refrigerant sent to the primary flow path of the cascade heat exchanger is less likely to be condensed, and high pressure in a primary refrigerant circuit is likely to rise. Accordingly, a primary compressor controlled to constantly keep condensation pressure is controlled to be decreased in number of revolutions for inhibition of rise in high pressure. In this case, the primary refrigerant is decreased in circulation quantity in the primary refrigerant circuit, whereas the secondary refrigerant is constant in circulation quantity in a secondary refrigerant circuit. The primary refrigerant flowing in the primary flow path of the cascade heat exchanger is thus further cooled by the secondary refrigerant. The primary refrigerant in a liquid state thus has larger proportion in the primary flow path of the cascade heat exchanger.

Particularly in the refrigeration cycle system achieving the binary refrigeration cycle, when circulation quantity of the secondary refrigerant in the secondary refrigerant circuit is controlled in accordance with a load at a utilization heat exchanger in the secondary refrigerant circuit, control of circulation quantity of the secondary refrigerant is difficult upon decrease in circulation quantity of the primary refrigerant in the primary refrigerant circuit. It is accordingly difficult to cancel increased proportion of the primary refrigerant in the liquid state in the primary flow path of the cascade heat exchanger.

This situation is likely to occur if the primary refrigerant preliminarily filled in the primary refrigerant circuit has large quantity. Furthermore, it may be particularly difficult to cancel the above situation if the primary refrigerant circuit does not include any receiver configured to reserve an excessive refrigerant and provided on a flow path for the liquid refrigerant.

In contrast, during heating operation and mainly heating operation when the primary flow path 35*b* of the cascade heat exchanger 35 functions as a condenser for the primary refrigerant in the refrigeration cycle system 1 according to the present embodiment, satisfaction of the predetermined start condition leads to finding that the primary liquid refrigerant is retained in the primary flow path 35*b* of the cascade heat exchanger 35. It is determined in the present embodiment that the primary liquid refrigerant is retained if the degree of subcooling of the primary liquid refrigerant in the primary flow path 35*b* of the cascade heat exchanger 35 is equal to or more than a predetermined value. When the primary liquid refrigerant is retained in the primary flow path 35*b* of the cascade heat exchanger 35, the primary refrigerant condensed in the primary flow path 35*b* is less likely to flow out of the primary flow path 35*b* to extend time to be cooled by the second refrigerant flowing in the secondary flow path 35*a*, thereby increasing the degree of subcooling of the primary liquid refrigerant in the primary flow path 35*b*. The refrigeration cycle system 1 according to the present embodiment starts excessive refrigerant control when finding that the primary liquid refrigerant is retained in the primary flow path 35b of the cascade heat exchanger 35 in this manner. During excessive refrigerant control, a region of the liquid refrigerant flowing in the primary refrigerant circuit 5a is connected to the suction side of the primary compressor 71 via the primary subcooling circuit 104. The retained primary liquid refrigerant thus flows toward the suction side of the primary compressor 71, to cancel retention of the primary liquid refrigerant in the primary flow path 35b. This improves heat exchange efficiency between the primary refrigerant and the secondary refrigerant in the cascade heat exchanger 35.

In the primary refrigerant circuit 5a, the primary subcooling circuit 104 is connected to a portion upstream of the primary accumulator 105 provided on the primary suction flow path 125. The primary accumulator 105 can thus reserve the primary liquid refrigerant even upon excessive refrigerant control, to avoid supply of the liquid refrigerant to the primary compressor 71. Particularly, the primary subcooling expansion valve 104a is controlled into the fully opened state during excessive refrigerant control, to inhibit supply of the liquid refrigerant to the primary compressor 71 even upon quick cancellation of retention of the liquid refrigerant in the primary flow path 35b of the cascade heat exchanger 35.

In the refrigeration cycle system 1 according to the present embodiment, adoption of carbon dioxide as a refrigerant in the secondary refrigerant circuit 10 decreases the global warming potential (GWP). Even if the refrigerant containing no chlorofluorocarbon leaks on the utilization side, there is no outflow of chlorofluorocarbon on the utilization side.

The refrigeration cycle system 1 according to the present embodiment adopts the binary refrigeration cycle, to exhibit sufficient capacity at the secondary refrigerant circuit 10.

(12) Other Embodiments (12-1) Other Embodiment A

The above embodiment exemplifies the case where the primary subcooling expansion valve 104a is opened upon excessive refrigerant control.

Figure 9:
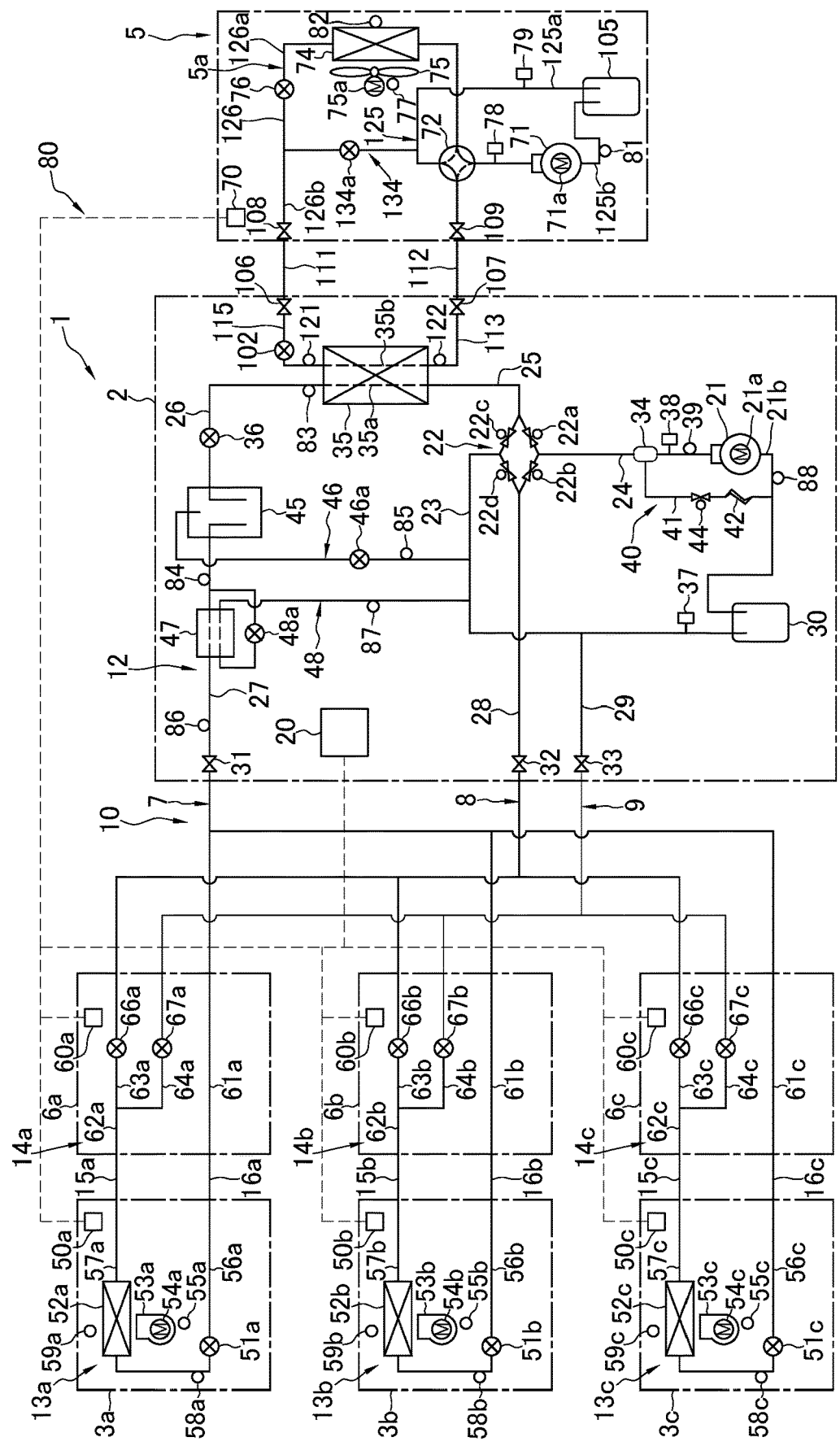
FIG. 9 is a schematic configuration diagram of a refrigeration cycle system according to another embodiment A.

In contrast, as depicted in FIG. 9, in place of or in addition to the primary subcooling circuit 104, the primary subcooling expansion valve 104a, and the primary subcooling heat exchanger 103 in the primary refrigerant circuit 5a according to the above embodiment, there may be provided a primary connection circuit 134 (corresponding to a bypass circuit) and a primary connection expansion valve 134a (corresponding to a controlling valve).

The primary connection circuit 134 connects the second liquid connecting pipe 126b included in the liquid connecting pipe 126 and the first suction flow path 125a included in the primary suction flow path 125. The primary connection expansion valve 134a is an electrically powered expansion valve provided in the primary connection circuit 134, configured to control quantity of the primary refrigerant passing the primary connection circuit 134, and having a controllable opening degree.

Upon excessive refrigerant control, the primary connection expansion valve 134a is controlled to be opened to allow the primary refrigerant to flow to the primary connection circuit 134, so as to achieve an effect similar to that of the above embodiment.

(12-2) Other Embodiment B

The above embodiment exemplifies the case where the primary subcooling expansion valve 104a is opened upon excessive refrigerant control.

Figure 10:
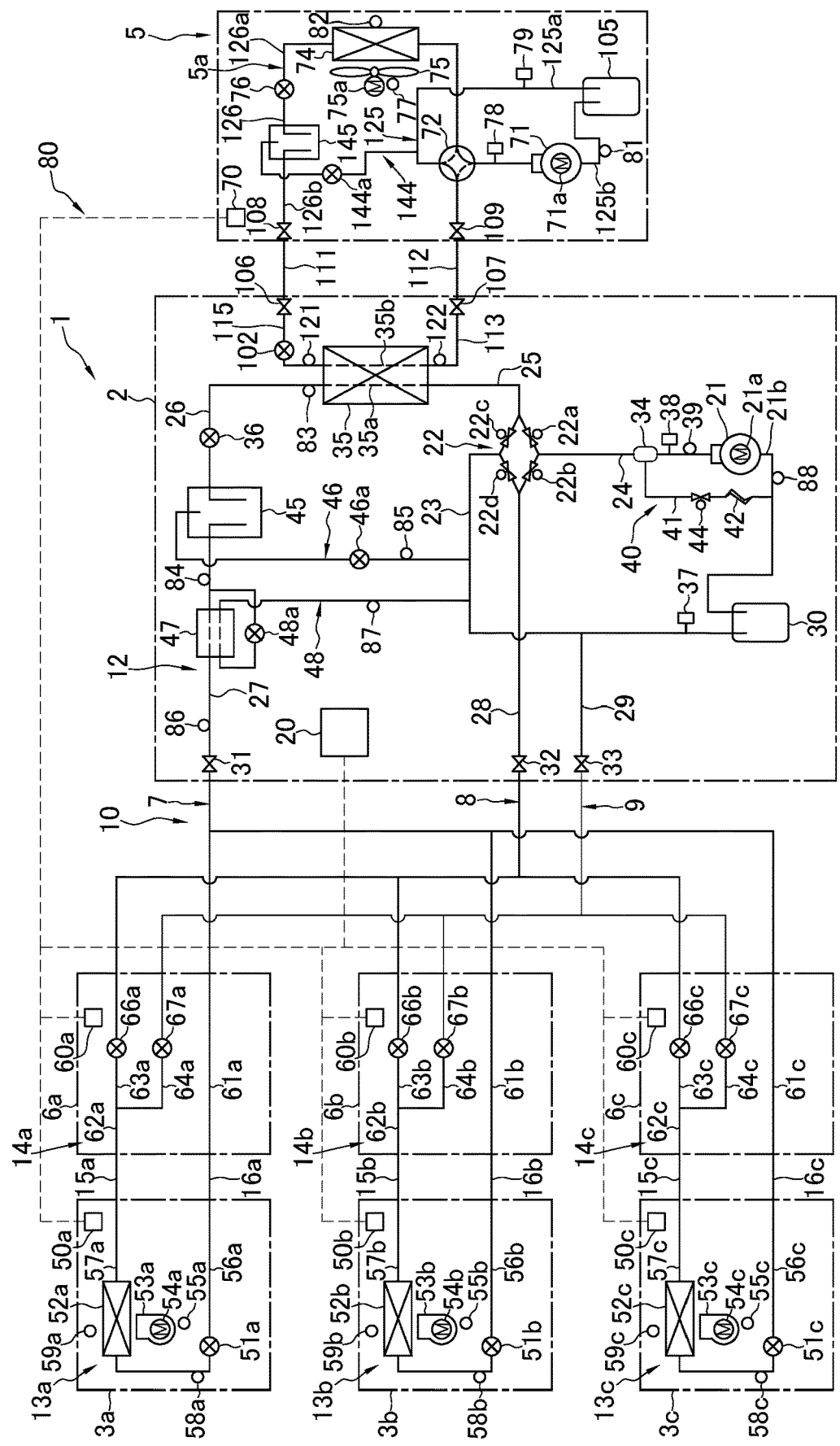
FIG. 10 is a schematic configuration diagram of a refrigeration cycle system according to still another embodiment B.

In contrast, as depicted in FIG. 10, in place of or in addition to the primary subcooling circuit 104, the primary subcooling expansion valve 104a, and the primary subcooling heat exchanger 103 in the primary refrigerant circuit 5a according to the above embodiment, there may be provided a primary receiver 145, a primary bypass circuit 144 (corresponding to a bypass circuit), and a primary bypass expansion valve 144a (corresponding to a controlling valve).

The primary receiver 145 is a refrigerant reservoir provided on the second liquid connecting pipe 126b included in the liquid connecting pipe 126, and is configured to reserve the primary refrigerant. Extend from the primary receiver 145 are a pipe connecting the inside of the primary receiver 145 and the primary first expansion valve 76 in the second liquid connecting pipe 126b, a pipe connecting the inside of the primary receiver 145 and the first liquid shutoff valve 108 in the second liquid connecting pipe 126b, and the primary bypass circuit 144. The primary bypass circuit 144 extends from a gas phase region in the primary receiver 145, and is connected to the first suction flow path 125a included in the primary suction flow path 125. The primary bypass expansion valve 144a is an electrically powered expansion valve provided in the primary bypass circuit 144, configured to control quantity of the primary refrigerant passing the primary bypass circuit 144, and having a controllable opening degree.

Upon excessive refrigerant control, the primary bypass expansion valve 144a is controlled to be opened to allow the primary refrigerant to flow to the primary bypass circuit 144, so as to achieve an effect similar to that of the above embodiment. Furthermore, provision of the primary receiver 145 in the primary refrigerant circuit 5a is less likely to cause retention of the liquid refrigerant in the primary flow path 35b of the cascade heat exchanger 35.

(12-3) Other Embodiment C

The above embodiment exemplifies the case where the valve opening degree of the primary subcooling expansion valve 104a is fully opened during excessive refrigerant control.

In contrast, during excessive refrigerant control, the primary subcooling expansion valve 104a according to the above embodiment, the primary connection expansion valve 134a according to the different embodiment A, and the primary bypass expansion valve 144a according to the different embodiment B may each alternatively be controlled into a predetermined opening degree, instead of being fully opened.

For example, during excessive refrigerant control, the primary subcooling expansion valve 104a, the primary connection expansion valve 134a, or the primary bypass expansion valve 144a may be controlled in opening degree such that the degree of superheating of the primary refrigerant sucked into the primary compressor 71 has a predetermined value.

Alternatively, during excessive refrigerant control, the valve opening degree of the primary subcooling expansion valve 104a, the primary connection expansion valve 134a, or the primary bypass expansion valve 144a may be controlled in accordance with the degree of subcooling of the primary refrigerant flowing at the outlet of the primary flow path 35b of the cascade heat exchanger 35. Specifically, the primary subcooling expansion valve 104a, the primary connection expansion valve 134a, or the primary bypass expansion valve 144a may be controlled such that the valve opening degree increases as the degree of subcooling of the primary refrigerant flowing at the outlet of the primary flow path 35b of the cascade heat exchanger 35 increases.

(12-4) Other Embodiment D

The above embodiment exemplifies the case where the valve opening degree of the primary subcooling expansion valve 104a is controlled into the fully opened state by excessive refrigerant control.

In contrast, excessive refrigerant control may include, in addition to control of the primary subcooling expansion valve 104a, control of the number of revolutions of the secondary compressor 21. For example, control of the number of revolutions of the secondary compressor 21 so as to be less than the number of revolutions upon satisfaction of the predetermined start condition achieves inhibition of heat exchange between the primary refrigerant and the secondary refrigerant in the cascade heat exchanger 35 and suppression of the degree of subcooling of the primary refrigerant in the primary flow path 35b. This can inhibit retention of the primary liquid refrigerant in the primary flow path 35b of the cascade heat exchanger 35.

During excessive refrigerant control, control of the valve opening degree of the primary subcooling expansion valve 104a is preferably prioritized than control to decrease the number of revolutions of the secondary compressor 21. In an exemplary case where the predetermined start condition is continuously satisfied or the predetermined end condition is not satisfied after predetermined time elapses from the start of control to increase or control to fully open the valve opening degree of the primary subcooling expansion valve 104a, there may be started control to decrease the number of revolutions of the secondary compressor 21.

(12-5) Other Embodiment E

The above embodiment exemplifies the case where excessive refrigerant control ends if the degree of subcooling of the primary refrigerant flowing at the outlet of the primary flow path 35b of the cascade heat exchanger 35 is less than the predetermined value.

In contrast, the condition for ending excessive refrigerant control is not limited thereto, and excessive refrigerant control may end after predetermined time elapses from the start of excessive refrigerant control.

(12-6) Other Embodiment F

The above embodiment exemplifies the case where excessive refrigerant control starts if the degree of subcooling of the primary refrigerant flowing at the outlet of the primary flow path 35b of the cascade heat exchanger 35 is equal to or more than the predetermined value.

In contrast, the predetermined start condition for the start of excessive refrigerant control is not limited thereto, but the following other condition may be adopted.

Examples of the predetermined start condition may include that a value obtained by subtracting low pressure of the secondary refrigerant in the secondary refrigerant circuit 10 from high pressure of the primary refrigerant in the primary refrigerant circuit 5a is equal to or more than a predetermined value. In this case, the heat source control unit 20 having received from the primary control unit 70 information on pressure detected by the primary discharge pressure sensor 78 may find the pressure in the information as high pressure of the primary refrigerant. The heat source control unit 20 may determine whether or not a value obtained by subtracting low pressure of the secondary refrigerant detected by the secondary suction pressure sensor 37 from high pressure of the primary refrigerant is equal to or more than a predetermined value, to determine the predetermined start condition.

The examples of the predetermined start condition may also include that a value obtained by subtracting evaporation temperature of the secondary refrigerant in the secondary refrigerant circuit 10 from condensation temperature of the primary refrigerant in the primary refrigerant circuit 5a is equal to or more than a predetermined value. In this case, the heat source control unit 20, which has received from the primary control unit 70 information on pressure detected by the primary discharge pressure sensor 78, may find saturation temperature of the primary refrigerant corresponding to the pressure in the information as condensation temperature of the primary refrigerant. The heat source control unit 20 may alternatively find, as evaporation temperature of the secondary refrigerant, saturation temperature corresponding to pressure of the secondary refrigerant detected by the secondary suction pressure sensor 37. The heat source control unit 20 may determine whether or not a value obtained by subtracting evaporation temperature of the secondary refrigerant from condensation temperature of the primary refrigerant is equal to or more than a predetermined value, to determine the predetermined start condition. In a case where the primary refrigerant and the secondary refrigerant are different from each other in refrigerant temperature-pressure characteristic, it is preferred to determine the predetermined start condition in accordance with a difference between temperature of the primary refrigerant corresponding to high pressure of the primary refrigerant and temperature of the secondary refrigerant corresponding to low pressure of the secondary refrigerant, than in accordance with a difference between the high pressure of the primary refrigerant and the low pressure of the secondary refrigerant. It is easier to accurately find that the primary liquid refrigerant is retained in the primary flow path 35b of the cascade heat exchanger 35. It is further preferred to determine in accordance with refrigerant temperature converted from refrigerant pressure, because the cascade heat exchanger 35 constituted by a plate heat exchanger or the like may have difficulty in installation of a temperature sensor configured to detect refrigerant temperature at an intermediate position on the primary flow path 35b or refrigerant temperature at an intermediate position on the secondary flow path 35a. When the secondary refrigerant circuit 10 executes heating operation or mainly heating operation, the heat source control unit 20 controls the valve opening degree of the heat source expansion valve 36 such that the degree of superheating of the secondary refrigerant sucked into the secondary compressor 21 has a predetermined value. In a state where the primary liquid refrigerant in the primary flow path 35b is retained in the cascade heat exchanger 35, it is difficult to sufficiently evaporate the secondary refrigerant flowing in the secondary flow path 35a, and the secondary refrigerant is likely to be decreased in degree of superheating. In this case, the heat source control unit 20 controls to decrease the valve opening degree of the heat source expansion valve 36 to inhibit decrease in degree of superheating of the secondary refrigerant. The secondary refrigerant is thus deceased in low pressure and is decreased in evaporation temperature. When the value obtained by subtracting evaporation temperature of the secondary refrigerant from condensation temperature of the primary refrigerant increases, it can be assumed that the primary liquid refrigerant is retained in the primary flow path 35b of the cascade heat exchanger 35.

The examples of the predetermined start condition may also include that a value obtained by subtracting temperature of the secondary refrigerant flowing into the secondary flow path 35a of the cascade heat exchanger 35 from condensation temperature of the primary refrigerant in the primary refrigerant circuit 5a is equal to or more than a predetermined value. In this case, the heat source control unit 20, which has received from the primary control unit 70 information on pressure detected by the primary discharge pressure sensor 78, may find saturation temperature of the primary refrigerant corresponding to the pressure in the information as condensation temperature of the primary refrigerant. The heat source control unit 20 may determine whether or not a value obtained by subtracting temperature of the secondary refrigerant detected by the secondary first temperature sensor 83 from condensation temperature of the primary refrigerant is equal to or more than a predetermined value, to determine the predetermined start condition. Decrease in temperature of the secondary refrigerant flowing into the secondary flow path 35a occurs in correspondence with decrease in low pressure of the secondary refrigerant and decrease in evaporation temperature of the secondary refrigerant.

(12-7) Other Embodiment G

The above embodiment exemplifies the case where excessive refrigerant control starts if the degree of subcooling of the primary refrigerant flowing at the outlet of the primary flow path 35b of the cascade heat exchanger 35 is equal to or more than the predetermined value. In contrast, the predetermined start condition for the start of excessive refrigerant control is not limited thereto, but, for example, the heat source control unit 20 may determine with reference to only the sensors included in the heat source unit 2 as in the following other condition. That is, the heat source control unit 20 may determine the predetermined start condition without obtaining information from the primary control unit 70 in the primary unit 5.

The examples of the predetermined start condition may include that a difference between temperature of the primary refrigerant flowing out of the primary flow path 35b of the cascade heat exchanger 35 and temperature of the secondary refrigerant flowing into the secondary flow path 35a of the cascade heat exchanger 35 is equal to or less than a predetermined value. In this case, the heat source control unit 20 may exemplarily determine whether or not a value obtained by subtracting temperature detected by the secondary first temperature sensor 83 from temperature detected by the primary first temperature sensor 121 is equal to or less than a predetermined value, to determine the predetermined start condition. If the temperature difference between the primary refrigerant flowing out of the primary flow path 35b and the secondary refrigerant flowing into the secondary flow path 35a is small in the cascade heat exchanger 35, it can be assumed that the primary refrigerant in the primary flow path 35b is excessively cooled and is retained in the cascade heat exchanger 35.

The examples of the predetermined start condition may include that the degree of superheating of the secondary refrigerant sucked into the secondary compressor 21 is equal to or less than a predetermined value. In this case, the heat source control unit 20 can find saturation temperature of the secondary refrigerant corresponding to pressure of the secondary refrigerant detected by the secondary suction pressure sensor 37. The heat source control unit 20 may determine whether or not a value obtained by subtracting temperature of the secondary refrigerant detected by the secondary suction temperature sensor 88 from the saturation temperature is equal to or more than a predetermined value, to determine the predetermined start condition. If the secondary refrigerant sucked into the secondary compressor 21 is decreased in degree of superheating, it can be assumed that the primary refrigerant cannot sufficiently heat the secondary refrigerant in the secondary flow path 35a of the cascade heat exchanger 35 and the primary liquid refrigerant is retained in the primary flow path 35b.

The examples of the predetermined start condition may also include that the valve opening degree of the heat source expansion valve 36 is less than a predetermined opening degree. In this case, the heat source control unit 20 may exemplarily determine whether or not the heat source expansion valve 36 has an opening degree controlled to be less than the predetermined opening degree, to determine the predetermined start condition. When the secondary refrigerant circuit 10 executes heating operation or mainly heating operation, the heat source expansion valve 36 is controlled such that the degree of superheating of the secondary refrigerant sucked into the secondary compressor 21 has a predetermined value. Accordingly, if the secondary refrigerant does not sufficiently exchange heat with the primary refrigerant in the secondary flow path 35a of the cascade heat exchanger 35 and the secondary refrigerant sucked into the secondary compressor 21 tends to be damp, the heat source expansion valve 36 will be controlled to have a small valve opening degree. Even in the case where the heat source expansion valve 36 is controlled to have a small valve opening degree, it can be assumed that the primary liquid refrigerant is retained in the primary flow path 35b.

For determination of the predetermined start condition described above, the heat source control unit 20 can determine the predetermined start condition in accordance with only values detected by the sensors included in the heat source unit 2. The heat source control unit 20 can thus determine the predetermined start condition without reference to information from the sensors included in the primary unit 5. Particularly, also in a case where the primary control unit 70 in the primary unit 5 is designed not to transmit values detected by the sensors included in the primary unit 5 to the heat source control unit 20 in the heat source unit 2 or a case where the heat source control unit 20 in the heat source unit 2 is designed not to receive from the primary control unit 70 in the primary unit 5 information of values detected by the sensors included in the primary unit 5, the heat source control unit 20 can determine whether or not the predetermined start condition is satisfied.

When the heat source control unit 20 determines the predetermined start condition, the above predetermined start condition is prioritized in view of determination accuracy, but the following predetermined start condition may alternatively be adopted. Specifically, the heat source control unit 20 may determine the predetermined start condition in accordance with that pressure of a low pressure refrigerant in the secondary refrigerant circuit 10 is equal to or less than a predetermined value, that evaporation temperature of the secondary refrigerant in the secondary refrigerant circuit 10 is equal to or less than a predetermined value, that temperature of the secondary refrigerant flowing into the secondary flow path 35a of the cascade heat exchanger 35 is equal to or less than a predetermined value, that pressure of a high pressure refrigerant in the secondary refrigerant circuit 10 is equal to or less than a predetermined value, that condensation temperature of the secondary refrigerant in the secondary refrigerant circuit 10 is equal to or less than a predetermined value, that temperature of the secondary refrigerant sucked into the secondary compressor 21 is equal to or less than a predetermined value, or temperature of air having passed the utilization heat exchanger 52a, 52b, or 52c is equal to or less than a predetermined value.

(12-8) Other Embodiment H

The above embodiment exemplifies the case where, upon excessive refrigerant control, the primary control unit 70, which has received information indicating satisfaction of the predetermined start condition transmitted from the heat source control unit 20, controls the valve opening degree of the primary subcooling expansion valve 104a.

In contrast, during excessive refrigerant control, the heat source control unit 20 having determined that the predetermined start condition is satisfied may directly control the valve opening degree of the primary subcooling expansion valve 104a. Direct control in this case indicates that the heat source control unit 20 controls the valve opening degree of the primary subcooling expansion valve 104a via the primary control unit 70. Specifically, the heat source control unit 20 transmits, to the primary control unit 70, a control command of controlling the valve opening degree of the primary subcooling expansion valve 104a, and the primary control unit 70 transmits a control command on the valve opening degree to the primary subcooling expansion valve 104a in accordance with the control command thus received.

In this manner, the primary subcooling expansion valve 104a may be controlled in opening degree by the primary control unit 70 not during excessive refrigerant control, and may be controlled by the heat source control unit 20 during excessive refrigerant control.

(12-9) Other Embodiment I

The above embodiment exemplifies the case where the primary control unit 70, which has received information indicating satisfaction of the predetermined start condition transmitted from the heat source control unit 20, controls the valve opening degree of the primary subcooling expansion valve 104a.

In contrast, the refrigeration cycle system 1 may be configured such that the primary control unit 70 cannot receive information indicating that the predetermined start condition is satisfied and transmitted from the heat source control unit 20, or may be configured such that the heat source control unit 20 cannot directly control the valve opening degree of the primary subcooling expansion valve 104a. Alternatively, the refrigeration cycle system 1 can be configured such that the heat source control unit 20 having found that the predetermined start condition is satisfied indirectly commands the primary control unit 70, so as to allow the heat source control unit 20 to indirectly control the valve opening degree of the primary subcooling expansion valve 104a.

In this case, the refrigeration cycle system 1 may be exemplarily configured such that the heat source control unit 20 can transmit, to the primary control unit 70, a control command on a condensation temperature target value of the primary refrigerant in the primary refrigerant circuit 5a, and the primary control unit 70 can receive the control command on the condensation temperature target value transmitted from the heat source control unit 20. The primary control unit 70 may be configured to control to increase or fully open the valve opening degree of the primary subcooling expansion valve 104a when high pressure of the primary refrigerant in the primary refrigerant circuit 5a is equal to or more than a predetermined value.

In this configuration, when the heat source control unit 20 having found that the predetermined start condition is satisfied transmits, to the primary control unit 70, a control command of increasing the condensation temperature target value of the primary refrigerant in the primary refrigerant circuit 5a, the primary control unit 70 increases the number of revolutions of the primary compressor 71 to achieve the condensation temperature target value thus increased. However, in the cascade heat exchanger 35 with the predetermined start condition being satisfied, the primary refrigerant and the secondary refrigerant have deteriorated heat exchange efficiency. Even if a primary high pressure refrigerant is supplied to the primary flow path 35b of the cascade heat exchanger 35, the primary refrigerant cannot be condensed efficiently. The primary refrigerant circuit 5a is thus increased in high pressure of the primary refrigerant. When the high pressure of the primary refrigerant in the primary refrigerant circuit 5a increases to be equal to or more than the predetermined value, the primary control unit 70 starts control to increase or fully open the valve opening degree of the primary subcooling expansion valve 104a. This can improve heat exchange efficiency between the primary refrigerant and the secondary refrigerant in the cascade heat exchanger 35.

In an exemplary case where the primary unit 5 is not designed specifically for the refrigeration cycle system 1 but is applied a heat source unit included in a refrigeration apparatus that achieves the unitary refrigeration cycle and includes a utilization unit having a utilization heat exchanger and the heat source unit having a heat source heat exchanger and a compressor and being connected with the utilization unit, occasionally, the primary control unit 70 cannot receive information indicating that the predetermined start condition is satisfied and transmitted from the heat source control unit 20, and the heat source control unit 20 cannot directly control the valve opening degree of the primary subcooling expansion valve 104a. Even in this case, the refrigeration apparatus for the unitary refrigeration cycle may be configured such that the compressor included in the heat source unit is controlled in number of revolutions in accordance with a load at the utilization heat exchanger included in the utilization unit. In the system thus configured, the utilization unit transmits, to the heat source unit, a control command on a control target value such as a condensation temperature target value in order to notify a heat source side of the load found by the utilization unit. In a case where the heat source unit in the refrigeration apparatus for the unitary refrigeration cycle is applied as the primary unit 5, the primary control unit 70 in the primary unit 5 can receive the control command on the control target value such as the condensation temperature target value. It is accordingly possible to achieve excessive refrigerant control while applying, as the primary unit 5, the heat source unit in the refrigeration apparatus for the unitary refrigeration cycle, which cannot receive from the heat source control unit 20 information indicating that the predetermined start condition is satisfied and the heat source control unit 20 cannot directly control the valve opening degree of the primary subcooling expansion valve 104a.

Particularly in a refrigeration apparatus configured to achieve the unitary refrigeration cycle and including a plurality of utilization units connected to a heat source unit, the heat source unit is preliminarily filled with the primary refrigerant that is likely to have large quantity, and the primary liquid refrigerant is likely to be retained in the primary flow path 35b of the cascade heat exchanger 35. Because the heat source unit included in the refrigeration apparatus for the unitary refrigeration cycle is applied to the refrigeration cycle system 1 in this manner, excessive refrigerant control described above can cancel retention of the primary liquid refrigerant that is likely to be retained in the cascade heat exchanger 35.

(12-10) Other Embodiment J

The above embodiment exemplifies R32 as the refrigerant provided in the primary refrigerant circuit 5a and carbon dioxide as the refrigerant provided in the secondary refrigerant circuit 10.

However, the refrigerant provided in the primary refrigerant circuit 5a should not be limited, and examples thereof include HFC-32, an HFO refrigerant, a refrigerant obtained by mixing HFC-32 and the HFO refrigerant, carbon dioxide, ammonia, and propane.

Furthermore, the refrigerant provided in the secondary refrigerant circuit 10 should not be limited, and examples thereof include HFC-32, an HFO refrigerant, a refrigerant obtained by mixing HFC-32 and the HFO refrigerant, carbon dioxide, ammonia, and propane.

Examples of the HFO refrigerant include HFO-1234yf and HFO-1234ze.

The primary refrigerant circuit 5a and the secondary refrigerant circuit 10 may adopt a same refrigerant or different refrigerants.

(12-11) Other Embodiment K

The above embodiment exemplifies, as the secondary refrigerant circuit 10, a refrigerant circuit having three pipes of the secondary first connection pipe 8, the secondary second connection pipe 9, and the secondary third connection pipe 7, and configured to simultaneously execute cooling operation and heating operation.

However, the secondary refrigerant circuit 10 should not be limited to such a refrigerant circuit configured to simultaneously execute cooling operation and heating operation, and may be a circuit including the heat source unit 2 and the utilization units 3a, 3b, and 3c connected via two connection pipes.

(12-12) Others

The cascade heat exchanger may be configured to cause heat exchange between the first refrigerant and the second refrigerant.

The controlling valve may be configured to be switchable between an opened state and a closed state, or may be configured to have a controllable valve opening degree.

APPENDIX

The embodiments of the present disclosure have been described above. Various modifications to modes and details should be available without departing from the object and the scope of the present disclosure recited in the patent claims.

REFERENCE SIGNS LIST

1: refrigeration cycle system
2: heat source unit
3a: first utilization unit
3b: second utilization unit
3c: third utilization unit
4: secondary unit
5: primary unit
5a: primary refrigerant circuit (first circuit)
7: secondary third connection pipe
8: secondary first connection pipe
9: secondary second connection pipe
10: secondary refrigerant circuit (second circuit)
11: heat source expansion mechanism
12: heat source circuit
13a-c: utilization circuit
20: heat source control unit (second control unit)
21: secondary compressor (second compressor)
21a: compressor motor
22: secondary switching mechanism
23: secondary suction flow path
24: discharge flow path
25: third heat source pipe
26: fourth heat source pipe
27: fifth heat source pipe
28: first heat source pipe
29: second heat source pipe
30: secondary accumulator
34: oil separator
35: cascade heat exchanger
35a: secondary flow path
35b: primary flow path
36: heat source expansion valve (second expansion valve)
37: secondary suction pressure sensor
38: secondary discharge pressure sensor
39: secondary discharge temperature sensor
40: oil return circuit
41: oil return flow path
42: oil return capillary tube
44: oil return on-off valve
45: secondary receiver
46: bypass circuit
46a: bypass expansion valve
47: secondary subcooling heat exchanger
48: secondary subcooling circuit
48a: secondary subcooling expansion valve
50a-c: utilization control unit
51a-c: utilization expansion valve
52a-c: utilization heat exchanger (second heat exchanger)
53a-c: indoor fan
56a, 56b, 56c: second utilization pipe
57a, 57b, 57c: first utilization pipe
58a, 58b, 58c: liquid-side temperature sensor
59a, 59b, 59c: indoor blow-out temperature sensor
60a, 60b, 60c: branching unit control unit
61a, 61b, 61c: third branching pipe
62a, 62b, 62c: junction pipe
63a, 63b, 63c: first branching pipe
64a, 64b, 64c: second branching pipe
66a, 66b, 66c: first control valve
67a, 67b, 67c: second control valve
70: primary control unit (first control unit)
71: primary compressor (first compressor)
72: primary switching mechanism
74: primary heat exchanger (first heat exchanger)
76: primary first expansion valve
77: outdoor air temperature sensor
78: primary discharge pressure sensor
79: primary suction pressure sensor
81: primary suction temperature sensor 82: primary heat-exchange temperature sensor
83: secondary first temperature sensor
84: receiver outlet temperature sensor
85: bypass circuit temperature sensor
86: subcooling outlet temperature sensor
87: subcooling circuit temperature sensor
88: secondary suction temperature sensor
80: control unit
102: primary second expansion valve
103: primary subcooling heat exchanger
104: primary subcooling circuit (bypass circuit)
104a: primary subcooling expansion valve (controlling valve)
105: primary accumulator (accumulator)
111: primary first connection pipe (first flow path)
112: primary second connection pipe
113: second connecting pipe
115: first connecting pipe (first flow path)
121: primary first temperature sensor
122: primary second temperature sensor
125: primary suction flow path (suction flow path)
125a: first suction flow path (first suction pipe)
125b: second suction flow path (second suction pipe)
126: liquid connecting pipe (first flow path)
134: primary connection circuit (bypass circuit)
134a: primary connection expansion valve (controlling valve)
144: primary bypass circuit (bypass circuit)
144a: primary bypass expansion valve (controlling valve)

CITATION LIST

Patent Literature

Patent Literature 1: WO 2018/235832 A

The invention claimed is:

1. A refrigeration cycle system comprising:
a first circuit, in which a first refrigerant circulates, includes a first compressor, a cascade heat exchanger, and a first heat exchanger;
a second circuit, in which a second refrigerant circulates, includes a second compressor, the cascade heat exchanger, and a second heat exchanger; and
a processor, wherein
the first circuit includes a first flow path connecting the cascade heat exchanger and the first heat exchanger, a suction flow path of the first compressor, a bypass circuit connecting the first flow path and the suction flow path, and a controlling valve provided in the bypass circuit, and
the processor is further configured to,
when the cascade heat exchanger functions as a radiator for the first refrigerant and functions as an evaporator for the second refrigerant, open the controlling valve in the event an index on a degree of subcooling of the first refrigerant at an outlet of the cascade heat exchanger satisfies a predetermined first condition.

2. The refrigeration cycle system according to claim 1, wherein
the processor is further configured to determine that the predetermined first condition is satisfied upon completion of at least one of
that a value obtained by subtracting temperature of the first refrigerant flowing out of the cascade heat exchanger from condensation temperature of the first refrigerant in the first circuit is equal to or more than a first predetermined value,
that a value obtained by subtracting pressure of a low pressure refrigerant in the second circuit from pressure of a high pressure refrigerant in the first circuit is equal to or more than a second predetermined value,
that a value obtained by subtracting evaporation temperature of the second refrigerant in the second circuit from condensation temperature of the first refrigerant in the first circuit is equal to or more than a third predetermined value, and
that a value obtained by subtracting temperature of the second refrigerant flowing into the cascade heat exchanger from condensation temperature of the first refrigerant in the first circuit is equal to or more than a fourth predetermined value.

3. The refrigeration cycle system according to claim 2, wherein
the first refrigerant is different in temperature-pressure characteristic from the second refrigerant, and
the processor is further configured to determine the predetermined first condition in accordance with a temperature difference between temperature of the first refrigerant found from pressure of the first refrigerant in the cascade heat exchanger and temperature of the second refrigerant found from pressure of the second refrigerant in the cascade heat exchanger.

4. The refrigeration cycle system according to claim 1, wherein
the second circuit further includes a second expansion valve provided between the second heat exchanger and the cascade heat exchanger and the processor is further configured to change a valve opening degree of the second expansion valve in accordance with a degree of superheating of the second refrigerant sucked into the second compressor,
the processor is further configured to determine that the predetermined first condition is satisfied upon completion of at least one of
that a difference between temperature of the first refrigerant flowing out of the cascade heat exchanger and temperature of the second refrigerant flowing into the cascade heat exchanger is equal to or less than a fifth predetermined value,
that the second refrigerant sucked into the second compressor has the degree of superheating equal to or less than a sixth predetermined value, and
that the opening degree of the second expansion valve is less than a predetermined opening degree.

5. The refrigeration cycle system according to claim 1, wherein
the first circuit further includes an accumulator,
the suction flow path of the first compressor includes a first suction pipe and a second suction pipe,
the first suction pipe, the accumulator, the second suction pipe, and the first compressor are connected in this order, and
the bypass circuit is connected to the first suction pipe.

6. The refrigeration cycle system according to claim 1, wherein
the processor is further configured to fully open the controlling valve when the first condition is satisfied.

7. The refrigeration cycle system according to claim 1, wherein
the processor is further configured to decrease a number of revolutions of the second compressor when the first condition is satisfied.

8. The refrigeration cycle system according to claim 1, the processor includes:

a first processor configured to control the first circuit; and
a second processor configured to control the second circuit.

9. The refrigeration cycle system according to claim 8, wherein
the second processor is configured to issue a control command for the controlling valve when the first condition is satisfied, and
the first processor is configured to issue a control command for the controlling valve when the first condition is not satisfied.

10. The refrigeration cycle system according to claim 2, wherein
the first circuit further includes an accumulator,
the suction flow path of the first compressor includes a first suction pipe and a second suction pipe,
the first suction pipe, the accumulator, the second suction pipe, and the first compressor are connected in this order, and
the bypass circuit is connected to the first suction pipe.

11. The refrigeration cycle system according to claim 3, wherein
the first circuit further includes an accumulator,
the suction flow path of the first compressor includes a first suction pipe and a second suction pipe,
the first suction pipe, the accumulator, the second suction pipe, and the first compressor are connected in this order, and
the bypass circuit is connected to the first suction pipe.

12. The refrigeration cycle system according to claim 4, wherein
the first circuit further includes an accumulator,
the suction flow path of the first compressor includes a first suction pipe and a second suction pipe,
the first suction pipe, the accumulator, the second suction pipe, and the first compressor are connected in this order, and
the bypass circuit is connected to the first suction pipe.

13. The refrigeration cycle system according to claim 2, wherein
the processor is further configured to fully open the controlling valve when the first condition is satisfied.

14. The refrigeration cycle system according to claim 3, wherein
the processor is further configured to fully open the controlling valve when the first condition is satisfied.

15. The refrigeration cycle system according to claim 4, wherein
the processor is further configured to fully open the controlling valve when the first condition is satisfied.

16. The refrigeration cycle system according to claim 5, wherein
the processor is further configured to fully open the controlling valve when the first condition is satisfied.

17. The refrigeration cycle system according to claim 2, wherein
the processor is further configured to decrease a number of revolutions of the second compressor when the first condition is satisfied.

18. The refrigeration cycle system according to claim 3, wherein
the processor is further configured to decrease a number of revolutions of the second compressor when the first condition is satisfied.

19. The refrigeration cycle system according to claim 4, wherein
the processor is further configured to decrease a number of revolutions of the second compressor when the first condition is satisfied.

20. The refrigeration cycle system according to claim 5, wherein
the processor is further configured to decrease a number of revolutions of the second compressor when the first condition is satisfied.

\* \* \* \* \*